(12) United States Patent
Venumadhav et al.

(10) Patent No.: US 11,714,069 B2
(45) Date of Patent: Aug. 1, 2023

(54) PROGRAMMABLE PAPER BASED DIAGNOSTICS

(71) Applicant: NORTHERN ILLINOIS RESEARCH FOUNDATION, Dekalb, IL (US)

(72) Inventors: Korampally Venumadhav, Aurora, IL (US); Kevin Dotseth, Palatine, IL (US); Yashodeep Patil, Reno, NV (US)

(73) Assignee: NORTHERN ILLINOIS RESEARCH FOUNDATION, Dekalb, IL (US)

( * ) Notice: Subject to any disclaimer, the term of this patent is extended or adjusted under 35 U.S.C. 154(b) by 817 days.

(21) Appl. No.: 16/423,735

(22) Filed: May 28, 2019

(65) Prior Publication Data

US 2019/0369071 A1 Dec. 5, 2019

Related U.S. Application Data

(60) Provisional application No. 62/678,677, filed on May 31, 2018.

(51) Int. Cl.
  *B01L 3/00* (2006.01)
  *G01N 30/92* (2006.01)
  *G01N 30/95* (2006.01)

(52) U.S. Cl.
  CPC ............ *G01N 30/92* (2013.01); *B01L 3/5023* (2013.01); *B01L 3/5027* (2013.01); *G01N 30/95* (2013.01);
  (Continued)

(58) Field of Classification Search
  CPC ........ G01N 30/92; G01N 30/95; G01N 30/90; G01N 30/6095; B01L 3/5023;
  (Continued)

(56) References Cited

U.S. PATENT DOCUMENTS

2012/0198684 A1   8/2012   Carrilho et al.
2017/0173578 A1*  6/2017   Crooks .................. G01N 33/68
(Continued)

FOREIGN PATENT DOCUMENTS

WO   WO-2014116756 A1 *  7/2014   ............ B01L 3/5023
WO   WO-2016176598 A1 * 11/2016   ............ B01L 3/5027
WO   WO-2018064775 A1 *  4/2018   ............ G01N 33/48

OTHER PUBLICATIONS

Kong et al., "A fast, reconfigurable flow switch for paper microfluidics based on selective wetting of folded paper actuator strips," Lab Chip, 17(21):3621-3633 (2017) (Year: 2017).*

(Continued)

*Primary Examiner* — Matthew D Krcha
*Assistant Examiner* — Sophia Y Lyle
(74) *Attorney, Agent, or Firm* — Barnes & Thornburg LLP

(57) ABSTRACT

A microfluidic diagnostic device comprises a base and at least one switch coupled to a portion of the base, the switch comprising a flap that is pivotable with respect to the base from a first position spaced away from the base a first distance to a second position where the flap is spaced away from the base a second distance. Both the base and the switch comprise one or more channels that permit passive transportation of an aqueous solution. The switch may be formed by bending or deforming a strip to cause the flap to be in the first position when there is less than a predetermined amount of fluid within the channel of switch. When a predetermined amount of fluid is in the channel of the switch, the flap pivots to the second position, which may be achieved through power from gravity, capillarity, and/or inherent elastic energy.

17 Claims, 20 Drawing Sheets
(18 of 20 Drawing Sheet(s) Filed in Color)

(52) U.S. Cl.
CPC . *B01L 2300/069* (2013.01); *B01L 2300/0681* (2013.01)

(58) Field of Classification Search
CPC .......... B01L 3/5027; B01L 2300/0681; B01L 2300/069; B01L 3/502738; B01L 2200/0621; B01L 2300/0812; B01L 2300/126; B01L 2400/0406; B01L 2400/0633; B01L 2400/08
See application file for complete search history.

(56) References Cited

U.S. PATENT DOCUMENTS

| | | | | |
|---|---|---|---|---|
| 2018/0214865 | A1* | 8/2018 | Lu | ........................ B01L 3/5023 |
| 2020/0039812 | A1* | 2/2020 | Liu | ........................ G01N 33/48 |

OTHER PUBLICATIONS

"A Timeline of Pregnancy Testing," accessed on-line at: https://history.nih.gov/exhibits/thinblueline/timeline.html (publicly available at the time of filing of the instant application).
"Biochemical Assays," accessed on-line at: www.nature.com/subjects/biochemical-assay, Mar. 2018.
"Microfluidics: A General overview of microfluidics," accessed on-line at: www.elveflow.com/microfluidic-tutorials/microfluidic-reviews-andtutorials/microfluidics, (Mar. 2018).
"Pregnancy Test," accessed on-line at: https://www.britannica.com/science/pregnancy-test#ref1118529, (publicly available at the time of filing of the instant application).
Bio-Rad, "Types of ELISA," accessed on-line at: https://www.bio-rad-antibodies.com/elisa-types-direct-indirect-sandwich-competition-elisa-formats.html, (publicly available at the time of filing of the instant application).
Carrilho et al, "Understanding Wax Printing: A Simple Micropatterning Process for Paper-Based Microfluidics," Anal. Chem., 81: 7091-7095 (2009).
Chen et al. "A fluidic diode, valves, and a sequential-loading circuit fabricated on layered paper," *Lab. Chip*, 12(16): 2909 (2012).
Chen et al., "Supporting Information for A Fluidic Diode, Valves and A Sequential-Loading Circuit Fabricated on Layered Paper," Lab on a chip, The Royal Society of Chemistry 2012, 2909-2913 (2012).
Engvall et al., "Enzyme-Linked Immunosorbent Assay, Elisa: III. Quantitation of Specific Antibodies by Enzyme-Labeled Anti-Immunoglobulin in Antigen-Coated Tubes," J. Immunol., 109(1): 129-132 (1972).
Fu et al., "Progress in the development and integration of fluid flow control tools in paper microfluidics," Lab Chip, 2017, 17: 614-628.
Gerbers et al., "A new paper-based platform technology for point-of-care diagnostics," Lab Chip, 14: 4042-4049 (2014).
Han et al., "Three-dimensional paper-based slip device for one-step point-of-care testing," *Sci. Rep.*, 6(1): Sep. 2016.
Kong et al., "A fast, reconfigurable flow switch for paper microfluidics based on selective wetting of folded paper actuator strips," *Lab Chip*, 17(21): 3621-3633 (2017).
Kuan et al., "Paper-based diagnostic devices for clinical paraquat poisoning diagnosis," Biomicrojluidics, 10(3): 034118, May 2016.
Li et al., "Paper-Based Microfluidic Devices by Plasma Treatment," Anal. Chem., 80: 9131-9134 (2008).
Lisowski et al., "Micro fluidic Paper-Based Analytical Devices (fAPADs) and Micro Total Analysis Systems (fAT AS): Development, Applications and Future Trends," Chromatographia (2013) 76:1201-1214.
Martinez et al., "Diagnostics for the Developing World: Microfluidic Paper-Based Analytical Devices," Anal. Chem. 2010, 82, 3-10.
Martinez et al., "Patterned Paper as a Platform for Inexpensive, Low Volume, Portable Bioassays," Angew Chem Int Ed Engl. 2007 ; 46(8): 1318-13.
Martinez et al., "Programmable diagnostic devices made from paper and tape," Lab Chip, 10:2499-2504 (2010).
Martinez et al., "Three-dimensional microfluidic devices fabricated in layered paper and tape," *Proc. Natl. Acad. Sci.*, 105(50): 19606-19611, Dec. 2008.
Noh et al. "Metering the Capillary-Driven Flow of Fluids in Paper-Based Microfluidic Devices," Anal. Chem. 2010, 82, 4181-4187.
Noh et al., "Fluidic Timers for Time-Dependent, Point-of-Care Assays on Paper," Anal. Chem. 2010, 82, 8071-8078.
Rouse, "What is Microfluidics," accessed on-line at: https://whatis.techtarget.com/definition/microfluidic, Sep. 2005.
Shin et al., "Programmed sample delivery on a pressurized paper," Biomicrojluidics, 8(5): 054121, Sep. 2014.
ThermoFisher Scientific, "Overview of ELISA, What is ELISA (enzyme-linked immunosorbent assay)?" accessed on-line at: https://www.thermofisher.com/us/en/home/life-science/protein-biology/protein-biology-learning-center/protein-biology-resource-library/pierce-protein-methods/overview-elisa.html (publicly available at the time of filing of the instant application).
Toley et al., "A versatile valving toolkit for automating fluidic operations in paper microfluidic devices," Lab Chip., 15(6): 1432-1444 (2015).
Wikipedia, "Assay," access on-line at: https://en.wikipedia.org/wiki/Assa, Multiple authors, Aug. 2016.
Wikipedia, "Printed Circuit Board," available on-line from the Internet at: https://en.wikipedia.org/wiki/Printed_circuit_board (Available prior to filing of the present application).
Xia et al., "Fabrication techniques for microfluidic paper-based analytical devices and their applications for biological testing: A review," Biosens. Bioelectron., vol. 77, pp. 774-789 (Mar. 2016).

* cited by examiner

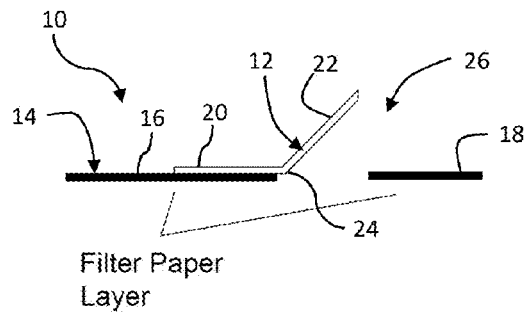 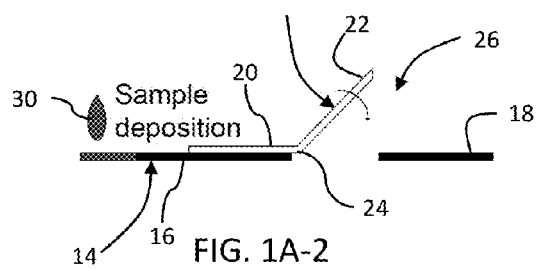
FIG. 1A-1
FIG. 1A-2
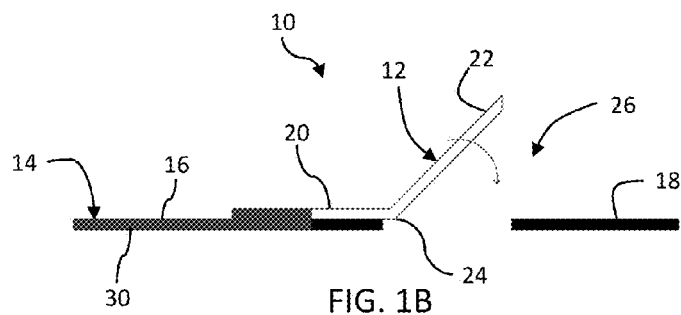
FIG. 1B
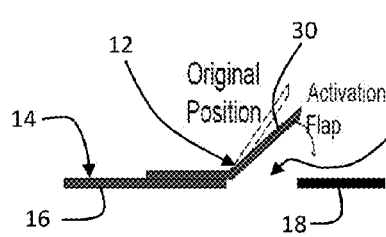 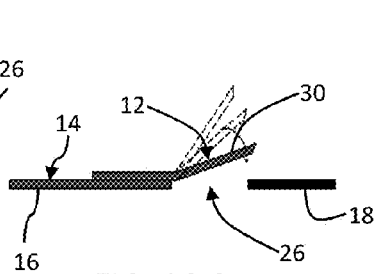 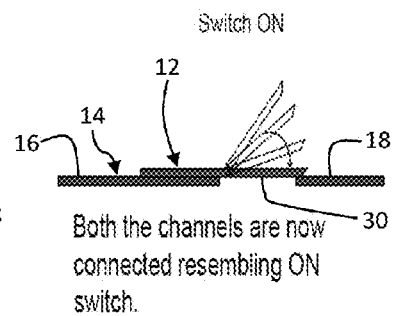
FIG. 1C-1
FIG. 1C-2
FIG. 1C-3

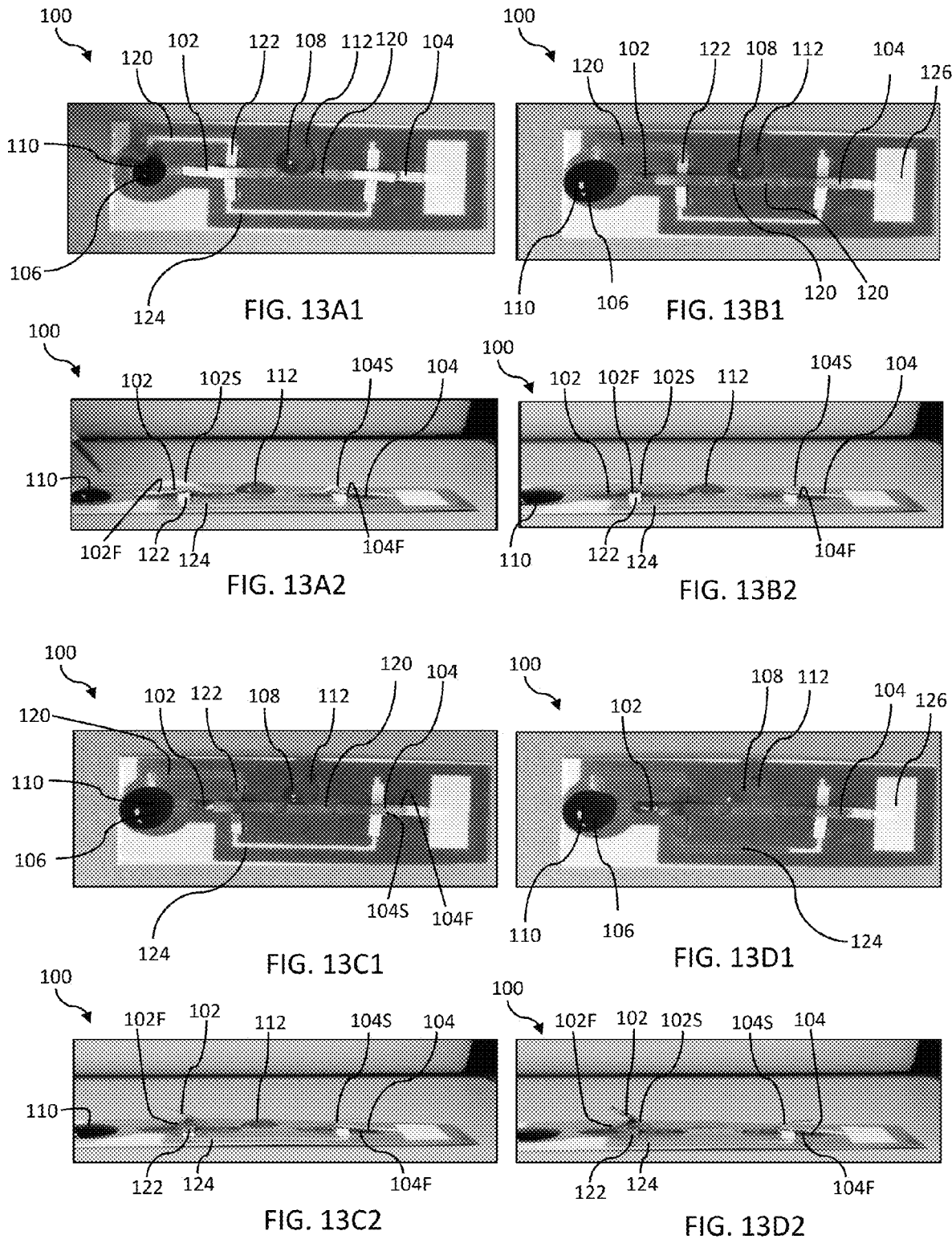

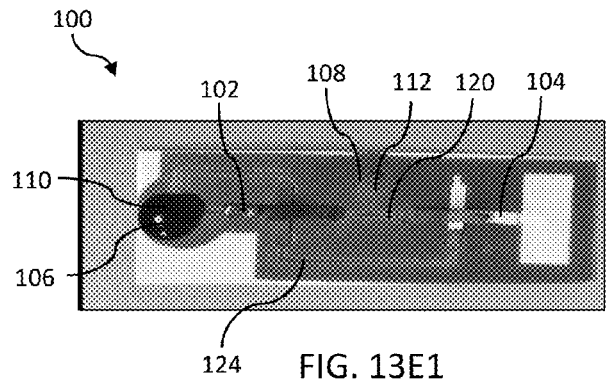
FIG. 13E1
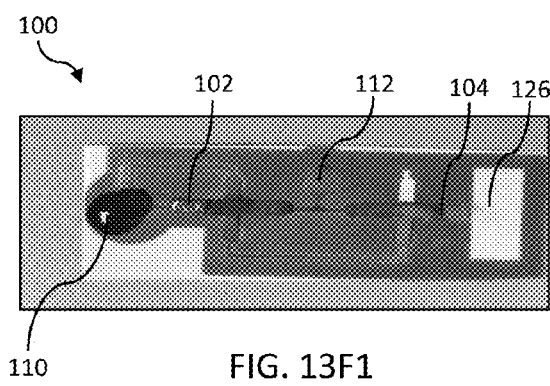
FIG. 13F1
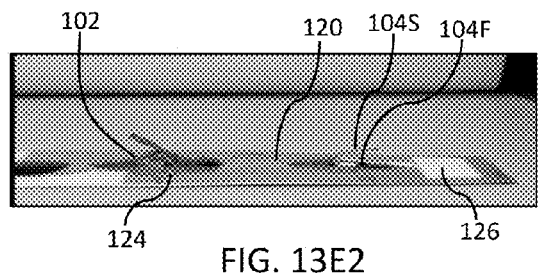
FIG. 13E2
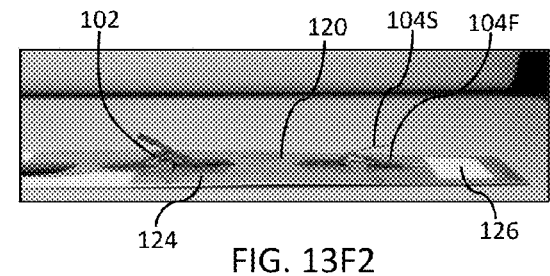
FIG. 13F2
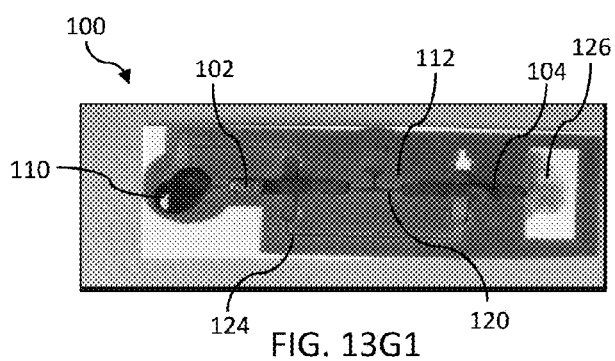
FIG. 13G1
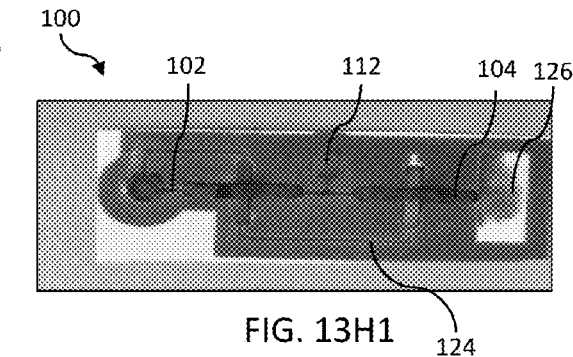
FIG. 13H1
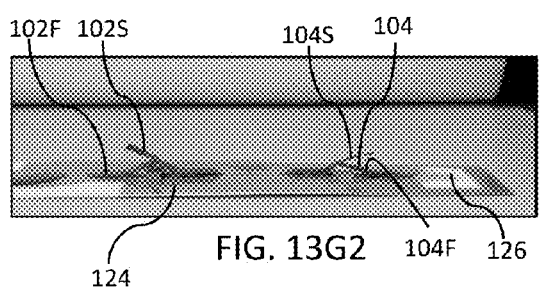
FIG. 13G2
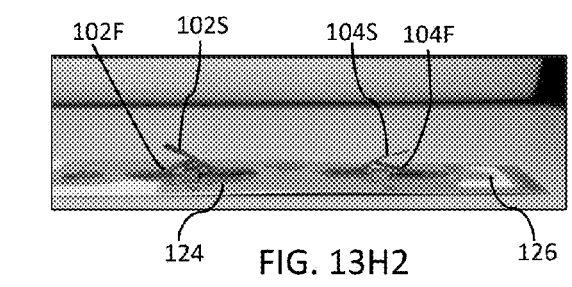
FIG. 13H2

FIG. 19A
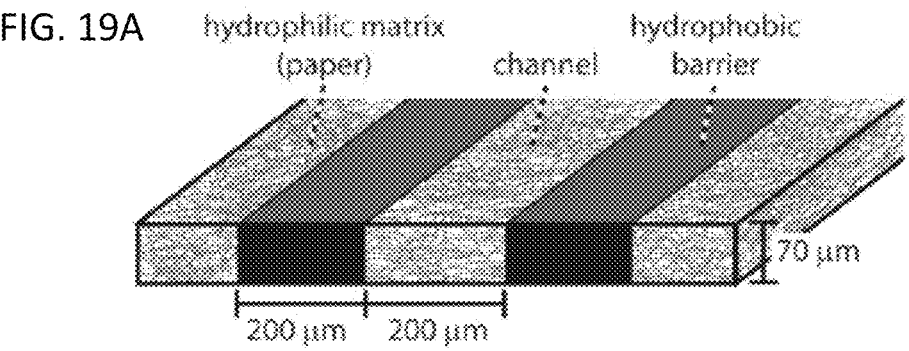
FIG. 19B cross-section cross-section FIG. 19D
 
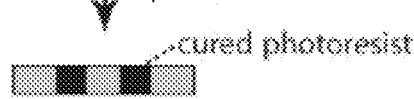

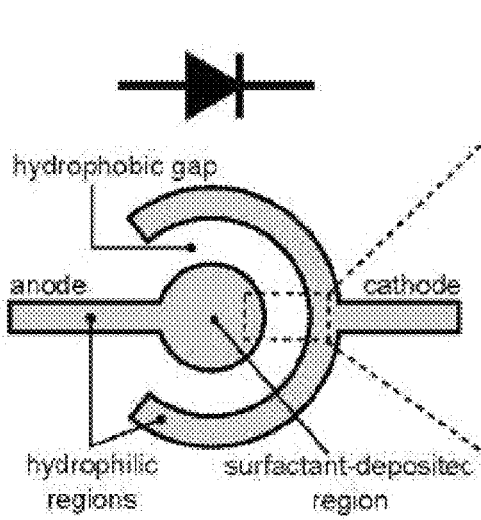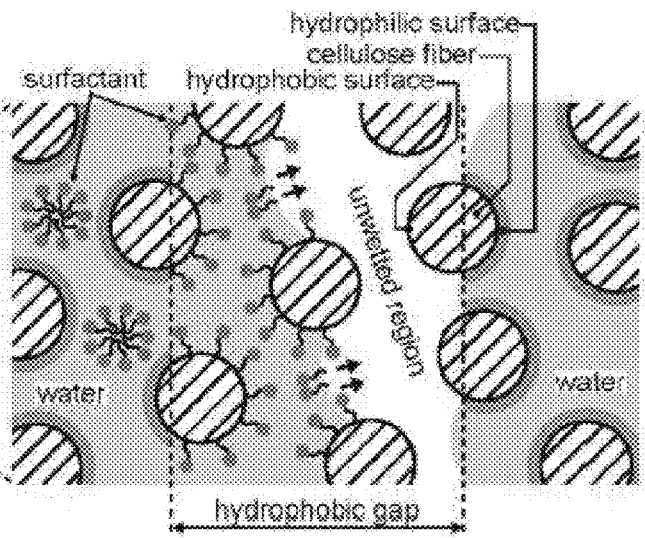
FIG. 21A    FIG. 21B
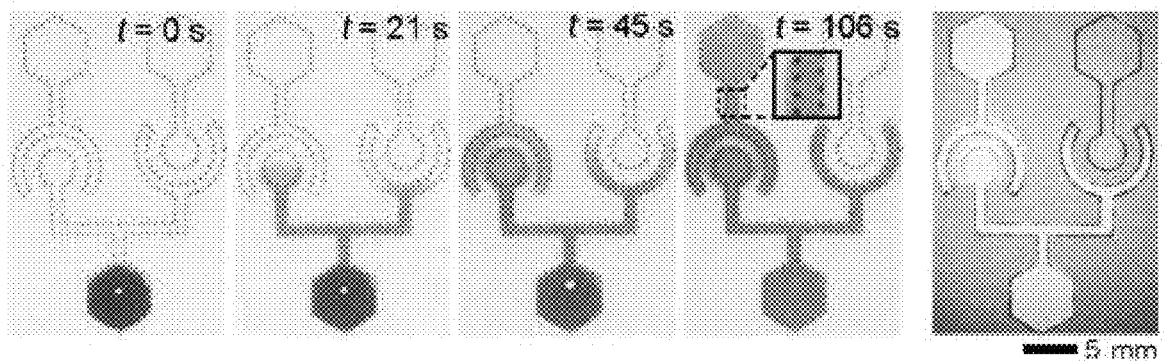
FIG. 21C    FIG. 21D
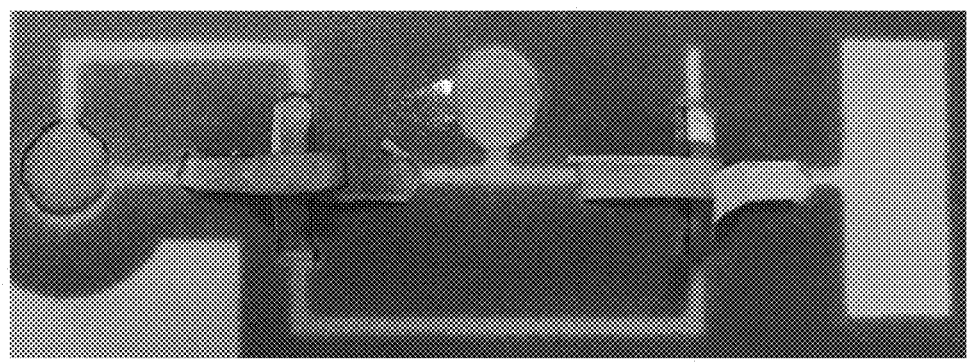
FIG. 22

PROGRAMMABLE PAPER BASED DIAGNOSTICS

CROSS-REFERENCE TO RELATED APPLICATIONS

This application claims the benefit of priority under 35 U.S.C. 119(e) to U.S. Provisional Patent Application No. 62/678,677, filed May 31, 2018. The disclosure set forth in the referenced application is incorporated herein by reference in its entirety.

BACKGROUND

Paper chromatography was developed in the 19th century and has been used to separate and identify mixtures small molecules, amino acids, proteins and antibodies. Since the last decade the scientific community has seen an exponential growth in the research-based on point•of-care diagnostics. Paper-based diagnostics is a subset of microfluidics in which like paper porous materials are used to create analytical devices. Further, the development of lateral flow immunoassay formats has led to a burgeoning growth in the field of point of care diagnostics. Over the last few decades, Lateral Flow ImmunoAssays (LFIAs) have become very important tools for a wide range of diagnostic applications. In addition to the vastly popularized home pregnancy test strips, they are now finding applications in a wide variety of fields, including point of care detection of infectious diseases, hormones and metabolites in biological fluids, food borne pathogen detection and even in environmental monitoring. The popularity of these devices essentially stems from their simplistic construction, relying primarily on 'paper' as the essential substrate through which the fluid flow as well as the detection occurs. Because the entire device is built from paper, these devices are extremely inexpensive, and can be easily disbursed to resource limited remote locations.

Early designs of such devices, while attractive, also have their shortcomings. The relatively simplistic construction of these early devices implied that the fluid flow through the devices could not be effectively regulated, thereby severely limiting the scope of these devices to simple biological assays. Currently, the Lateral Flow ImmunoAssays (LFIAs) are not able to perform complex multi-step immunodetection tests because of their inability to introduce multiple reagents in a controlled manner to the detection area autonomously. Most biological assays, for example, ELISA, require complex multi-step fluid processing steps that these devices could not accommodate. Further, the early lateral flow assay-based diagnostic strips were primarily meant to be qualitative assays (not quantitative) and suffered from relatively low sensitivities.

Over the last decade, pioneering work on methods of patterning microfluidic networks in paper, 3D microfluidics, programmable microfluidics and paper-based ELISA, led to a renewed interest in paper diagnostics. New methods of controlling fluid flow were reported that may be broadly classified to include development of manual switches, integrated microfluidic valves in paper, patterning paper and treating/functionalizing paper to introduce fluidic delays to accomplish the diagnostic tasks.

However, current state of the art devices are incapable of achieving such control due their passive nature. Although there has been reports on the use of active switches in paper based diagnostic devices, these switches required external power sources (example, electromagnetic switches etc.) that add additional complexity as well as cost to the device manufacture/operation.

Although there has been a significant interest in the development of paper based diagnostic devices, techniques are not currently available that could enable accurate control of the flow of fluids through paper networks. For the performance of multi-step complex biological assays, it becomes critical to control the amount of reagent delivered to the reaction zone, incubation time, and multiple washing steps, all in a pre-programmed manner. Because these devices are targeted towards resource poor settings, it is desirable for these devices to be able to perform the assays with minimal external user intervention such that users, without any formal education/training, could use these devices effectively.

SUMMARY

A new method of implementing microfluidic paper based switches is disclosed that, when integrated into a paper based microfluidic network enables automation of complex, multi-step biological assays. Patterned paper based devices have been developed and demonstrated for diagnostic applications. Patterning essentially involves creating distinct, well defined regions of hydrophobicity and hydrophilicity, thereby confining the fluid flow through specific hydrophilic channel patterns. Fluids in these devices move by wicking action, i.e., capillary forces generated by the substrate porous materials. A number of techniques can enable the patterning of such channels. The prominent ones include wax printing and plasma based approaches. Although a significant step towards the development of next generation point of care diagnostic devices, these approaches are still limited to simple single or a few steps biological assays and often are qualitative or a semi-quantitative. Because they do not require electricity or permanent instruments to operate, paper microfluidic devices present a useful platform for designing portable, low-cost, technically simple biochemical sensors. The proposed methods and devices essentially integrate the active switches into traditional paper-based microfluidic networks and push the state of the art in making paper diagnostics devices much more amenable towards a host of biological assays while keeping the cost low. These switches operate entirely based off power derived from gravity, capillary pressure and elastic energy.

The methods and devices disclosed herein automate the performance of complex biological assays on paper based format. With the use of capillary pressure and capillary action, the flow of fluid is precisely monitored and controlled. Novel aspects stem from the simplistic design of using a single layered paper, and the fabrication and integration of active switches into paper based diagnostic networks that function without the requirement of any additional external power sources. These switches are capillary powered, deriving power from elastic energy sources. These switches are configured to be both On/Off switches (valves) such that fluid flow within a paper based microfluidic network may be accurately controlled. Such switches offer unique capabilities to fine-tuned control of fluid flow through microfluidic networks in paper.

Such simple microfluidic paper based switches that are configured to be under multiple states (for instance OFF→ON→OFF) at set time intervals, have not been reported. Such switches offer unique capabilities to fine tune control of fluid flow through microfluidic networks in paper. Further, these switches may also be used as time delays in delaying the fluid flow through a given region. All of these features of the switches make them very attractive from the point of view of fabricating inexpensive paper based diagnostic devices.

Another important aspect is that the entire microfluidic device structure is completely modular in design. Each component of the device, including the microfluidic switches, may be separately realized and later integrated into the final structure making this approach highly modular, and facilitating easily scaled up production of these devices.

Fabrication of inexpensive diagnostic devices has the capability of performing complex biological assays under resource poor settings, with minimal external user intervention. The devices are useful for bed-side diagnostics, diagnostics for resource poor locations (e.g., third world countries, soldiers on the field), and include evaluating food and water safety.

BRIEF DESCRIPTION OF THE DRAWINGS

The patent or application file contains at least one drawing executed in color. Copies of this patent or patent application publication with color drawings will be provided by the office upon request and payment of the necessary fee.

FIG. 1A-1 illustrates a side-perspective view of an illustrative embodiment of a microfluidic device/structure, illustrating the structure includes a base or channel and a switch coupled to a first portion of the base, the switch being bent or deformed such that a flap of the switch is spaced away from a second portion of the base;

FIG. 1A-2 illustrates the microfluidic device structure of FIG. 1A-1, illustrating introduction of a sample deposit on a first portion of the base that is spaced away from the second portion of the base;

FIG. 1B illustrates the microfluidic device structure of FIG. 1A-1 as the fluid front moves forward on the first portion the base and then extends into a connection arm of the switch that is coupled to the first portion of the base;

FIG. 1C-1 illustrates the microfluidic device structure of FIG. 1A-1 as the fluid front moves within the flap of the switch, thereby causing the flap to rotate about a bend in the switch toward the second portion of the base;

FIG. 1C-2 illustrates the microfluidic device structure of FIG. 1C-1 as the flap rotates downward toward the second portion of the base;

FIG. 1C-3 illustrates the microfluidic device structure of FIG. 1C-1 after the flap has engaged with the second portion of the base, thereby creating a fluid connection between the first portion and the second portion of the base, which is similar to an ON switch that may be activated by a predetermined amount of time;

FIG. 3 is an illustrative diagram of a microfluidic structure including a switch, a fluid channel, and a gate fluidly connecting the channel with the switch;

FIGS. 13A1-13H2 shows the flow of liquid through channels of an exemplary microfluidic device at various times, with the X1 figures illustrating a top view while X2 figures illustrate a side view of the device at the same moment in time as the top view;

FIGS. 19A-19E illustrate production of a paper-based microfluidic channel, with 19A illustrating a schematic of the paper-based microfluidic channel, 19B illustrating a cross-section of photolithography on paper, 19C illustrating an example of paper fabricated by photolithography, 19D illustrating a cross-section of wax printing on paper, and 19E illustrating an example of a paper device fabricated by wax printing;

FIGS. 21A-21D illustrate an exemplary embodiment of a diode valve and time sequence photographs of a two-reagent biological assay test, illustrating a symbol and schematic of the diode (A), a microscopic schematic (B), a time sequential photograph series (C), and a photograph at the end of the test (D);

FIG. 22 is an illustrative embodiment of an exemplary design of a microfluidic device;

DETAILED DESCRIPTION

Microfluidics Background

Figure 1D:
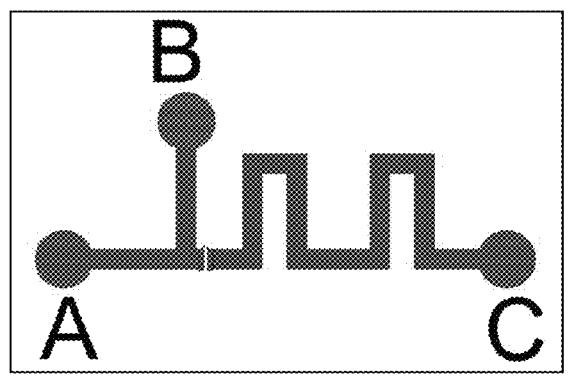
FIG. 1D shows an illustrative schematic of a switch mechanism that mimics the electrical analog of transistor operation and may be used to control or create sequential delivery of two fluids A and B to a sink region C.

Microfluidics is the science which studies the behavior of fluids through microchannels including its design and fabrication of devices that are geometrically constrained to small typically millimeter and sub-millimeter levels. Microfluidics is often used and described in "lab on a chip" and "organ on a chip" technology, but microfluidics can be applied to a wide range of applications. "Lab on a chip" essentially is a miniaturized version of an actual lab. It refers to devices and technologies that allow us to perform experiments and assays requiring a lab setting to be performed on a portable handheld device. It is gaining interest in the research community because of its advantages such as precision of the experiment, lower limits of detection and the ability to run multiple assays at the same time. The applications of microfluidics are in a wide range of industries such as cosmetics, pharmaceuticals, health diagnosis, flow synthesis and stoichiometry and energy.

A biological assay is an investigation for assessing qualitatively and measuring quantitatively the presence, amount or functional activity of a target entity. A biological assay is an analytical in vitro procedure used to detect, quantify and/or study the binding or activity of a biological molecule, such as an enzyme. It involves use of external reagents which will react with the target antibody or target reagent and give us a visible signal in form of color change or precipitation or similar results. At times, the target protein is bound to some other reagent which will then react with the incoming reagent and thus indirectly prove the presence of target reagent. Certain assays show very little or negligible amount of color change or such results. Hence, signal amplifiers are used to amplify the result signal within a detectable range. As an example, in a mixture of DNA sequences, only the specific target is amplified millions of times by using DNA polymerase enzyme [9]. The detection of the result signal can be through normal eyes, other chemical methods or by using sophisticated electronic and digital equipment.

The use of paper in diagnosis dates long back to the early nineteenth century. After the detection of the chemical substance which we call 'Hormone' today during the 1890s, there was a huge growth in the research based on detection of pregnancy. In the 1920s scientists were able to recognize a specific hormone called 'HCG' which was found only in pregnant women. Initial testing methods took about three to four days for the results to show up, but as technology advanced, the time came down to about 4 hours. The first paper-based pregnancy test kit was invented in the 1960s and was marketed in Europe and then in North America in the mid-1970s. Since then the significance and advantages of use of paper in diagnosis has led to a growth in the research in this field. This growth saw a breakthrough advancement in critical healthcare when Martinez et al. published a paper in Analytical Chemistry in 2007. It was proven that paper can be used for detection of various types of substances and compounds. In fact, they can also be used for forensic applications. There is a wide variety of paper that can be employed to build microfluidic devices, with compositions ranging from cellulose to glass or polymer, and each type of paper can bring different functionality depending on the applications. One of the first paper diagnostic devices created was for urine analysis. They can also be used for detection of toxins and pathogens. These devices work on the principle of capillary action and/or elastic energy sources and hence eliminated the need of external power supply. Other than just that, these devices are made of paper and are extremely cheap. A simple micropad typically can be fabricated for <$0.01 (for the cost of the paper and patterning). Patterned paper-based devices have been developed and demonstrated for diagnostic applications. Patterning involves creating distinct well-defined regions of hydrophobicity and hydrophilicity thereby confining the fluid flow through specific hydrophilic channel patterns. Several techniques have been reported to enable the patterning of such channels. The prominent ones include wax printing and plasma-based approaches. While a significant step towards the development of next-generation point-of-care diagnostic devices, these approaches are still limited to simple single-step or few-steps biological assays and often are qualitative or a semi-quantitative.

An ELISA (enzyme-linked immunosorbent assay) is a plate-based assay technique designed for detecting and quantifying substances such as peptides, proteins, antibodies and hormones. ELISA is a very useful tool since it can detect the presence of antigen or the presence of antibody in a sample. The procedure of ELISA results to show color change whose intensity depends on the concentration of the target. An antigen from a specific sample is attached to the surface. A specific antibody which can bind to that antigen is applied over the surface. Generally, this antigen-antibody linking doesn't show any visible signs of the bonding. Hence it becomes difficult to check if the binding is really done or not. As a solution, the antibody is linked to an enzyme before applying on the surface. In the final step, a substance containing the enzyme's substrate is added. The subsequent\ reaction produces a signal which most commonly is a detectable color change in the substrate.

Figure 18A:
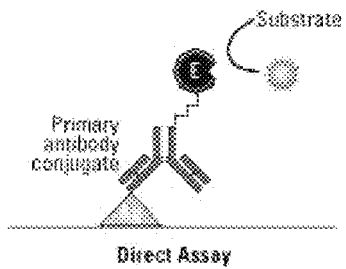
FIGS. 18A-18C illustrate different types of ELISA (enzyme-linked immunosorbent assay) detection processes.
Figure 18B:
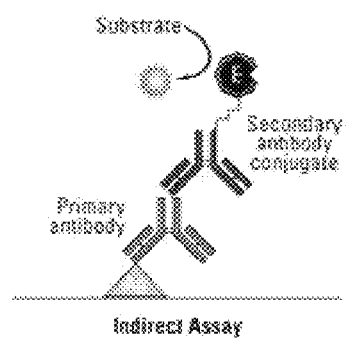
Figure 18C:
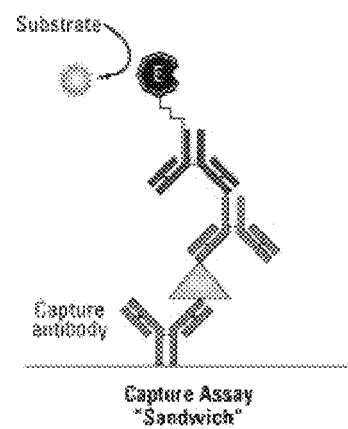

As illustrated in FIGS. 18A through 18C, the types of ELISA include:

Direct ELISA (FIG. 18A)—The antigen is detected by an antibody directly conjugated to an enzyme.

Indirect ELISA (FIG. 18B)—The detection is a two-step process. In the first stage, an unlabeled primary antibody binds to specific antigen. And in the second stage, an enzyme-conjugated secondary antibody that is directed against the host of the primary is applied.

Sandwich ELISA (FIG. 18C)—This assay requires matched antibody pairs. Each antibody is specific for a different non-overlapping region of the antigen. In this assay, the first step is to coat the plate with a capture antibody. The analyte is then added followed by a detection antibody. The detection antibody can be either labelled or unlabeled.

Paper Diagnostics

Figure 19C:
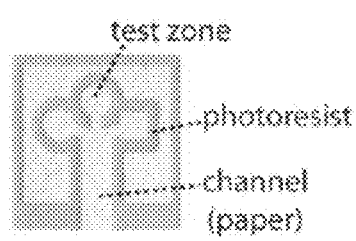
Figure 19E:
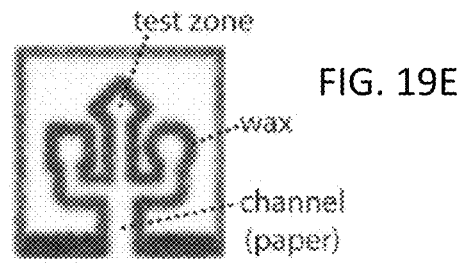
Figure 20A:
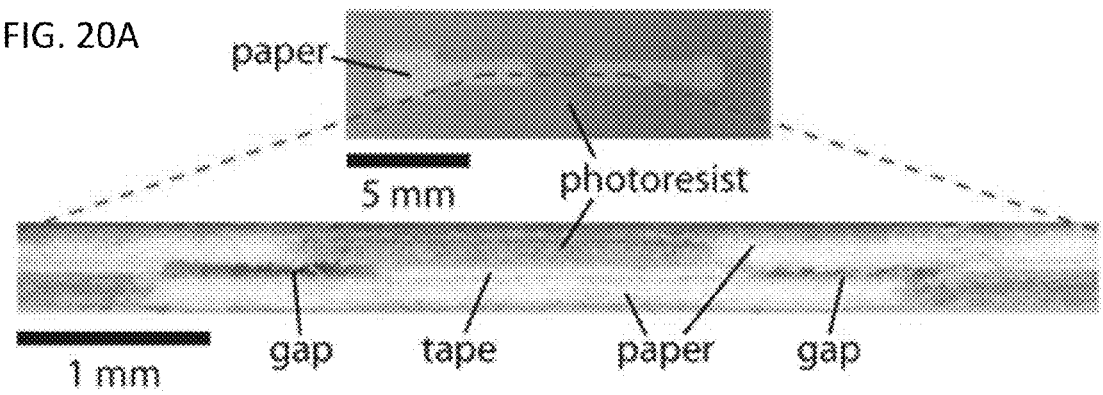
FIGS. 20A-20D illustrate various steps of an exemplary three-dimensional micropad process.
Figure 20B:
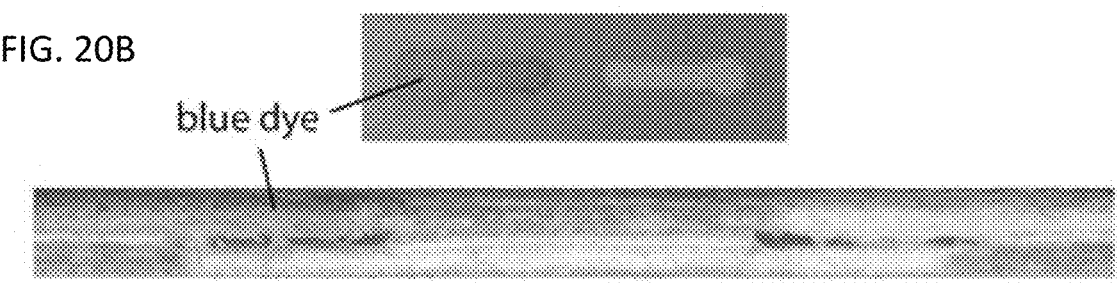
Figure 20C:
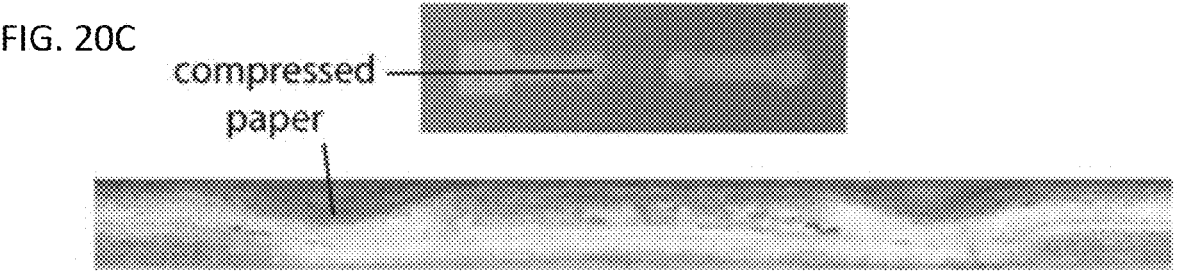
Figure 20D:
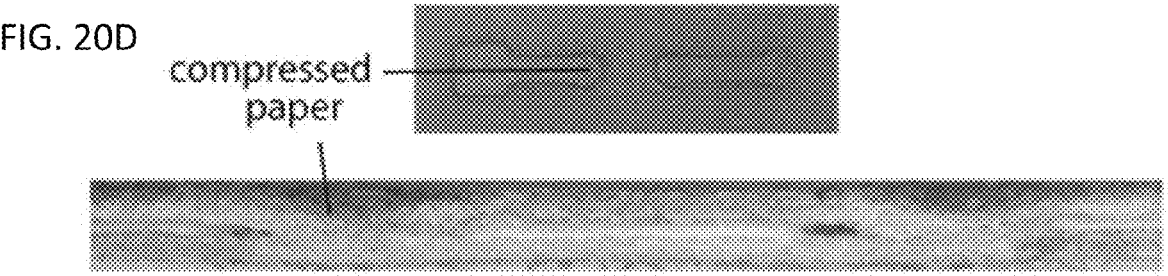

Use of paper in diagnostics has been shown through devices such as micropads (upads). Various methods of patterning paper are known, including photolithography, plotting, inkjet etching, plasma etching, cutting and wax printing. Examples of such patterning methods are shown in FIG. 19. Other types of paper diagnostics include the use of 2-dimensional micro-pads. As illustrated in FIG. 20, a paper device may be formed (see (A)) with two vertically arranged microfluidic channels. Typically, when a liquid or substance is added to one channel (see (B)), it is not transmitted to the other channel. However, pressing the space between the channels with a ball point pen or stylus (to compress the paper), as seen in (C), and then introducing a liquid to one channel can permit transmission into the other channel (e.g through wicking), as seen in (D). Other types of programmable micropads are known for running combinations of calorimetric assay.

As illustrated in FIG. 21, another form of diagnostics includes a flow tool that is based on diverting fluid into an absorbent shunt parallel to the porous channel in order to slow the progression of the fluid front. Specifically, the capillary force and fluidic resistance of the shunt material relative to the main channel determine the fluid time delay produced by the shunt. By changing the shunt length, the delay could be adjusted. Another research group created what they called as fluidic diode. This valve allowed the flow of liquid only in one direction and prevented its flow in another direction. FIG. 21 illustrates a similar process of two-reagent device to prove its capability for performing biological assay. It shows the schematic of the diode valve and times sequence photographs of the test.

Basic Paper Switch Design:

The basis of the present disclosure is a device that arises from the intrinsic properties of paper. Paper (e.g. wax paper) is essentially made of cellulose fibers that are hydrophilic and have a natural tendency to absorb moisture and as a consequence, undergo volume expansion. When mechanically bent about an axis, paper strips essentially strain the cellulose fibers at the bent region. When paper strips featuring the bent section are exposed to water, water infiltration (through capillary action) through the fibrous network and the accompanying volume expansion of each individual fiber, particularly at the bent section, tends to actuate the bent paper flap back towards it natural (unbent) configuration. The flap rotates about the bent line towards the normal, unstrained position; the extent of actuation depends on the initial angle of the switch, the force applied for bending the paper, as well as the thickness and density of the paper material. By choosing the appropriate thickness, the actuating angle may be controlled such that the folded paper flap actuates to near horizontal configuration.

In illustrative embodiments, a microfluidic structure 10 includes a switch 12 and a base 14. The switch 12 is coupled to the base 14, the base 14 being comprised of filter paper or other similar material. Both the switch 12 and base 14 are configured to permit fluid to move therethrough. The switch 12 is specifically coupled to a first portion 16 of the base that is spaced away from a second portion 18 of the base by a gap 26. The switch 12 includes a connection arm 20 and a flap portion 22 that is angled with respect to the connection arm 20. More specifically and illustratively, the connection arm 20 is connected to the flap portion 22 at a bend section 24. As shown in FIGS. 1A-1 to 1C-3, when a sample 30 is deposited on the first portion 16 of the base 14 that is connected to the connection arm 20 of the switch 12, the fluid extends through the first portion 16 to the connection arm 20, into the connection arm 20 of the switch 12, through the bent section 24 of the switch, and then into the flap section 22 of the switch 12. In light of the fluid extending into the flap section 22, the flap section 22 starts to move to attain its initial unbent position. In illustrative embodiments, the rate of such attainment may be directly proportional to the fluid front on the flap section 22. As the flap section 22 moves to its initial unbent position, it then connects to or touches the second section 18 of the base 14, thereby fluidly connecting the first portion 16 and the second portion 18. Accordingly, such a device is a Timed ON device that permits timed control of introduction of fluid into the second section 18 of the base 14. Such a device may be useful for diagnostic testing that, for example, requires timed elements for diagnosis, although other purposes are envisioned herein.

In various embodiments, FIG. 1D can illustrate a schematic of a switch mechanism that mimics an electrical analog of a transistor operation. In FIG. 1D fluid control is desired from two points such that sequential delivery of fluid may occur to the sink region (region C). Here the fluid A should reach the drain, denoted by C; followed by fluid B. Incorporation of time delays here is simply accomplished either by changing the path length of the fluid that each individual channel has to transverse before reaching the sink region or by varying the dimensions of each individual channel guided by the classic Washburn's equation to accurately control the timing of fluidic delivery.

In short, such switches offer unique capabilities to fine-tuned control of fluid flow through microfluidic networks in paper.

Figure 2A:
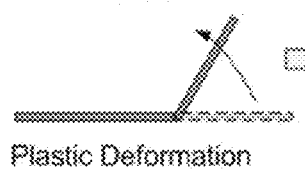
FIG. 2A-2C illustrate a side perspective view of portions of an alternative embodiment of a microfluidic structure, illustrating a switch comprising a Mylar strip that is deformed to create a flap, the switch being adhesively coupled to a patterned paper with the flap coupled thereto, and illustrating release of the flap to be away from the patterned paper after a fluid is introduced in the patterned paper that reduces that strength of the adhesive between the flap and the patterned paper.
Figure 2B:
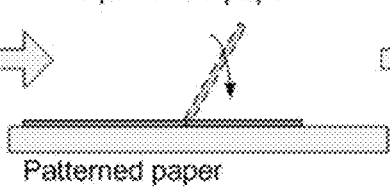
Figure 2C:
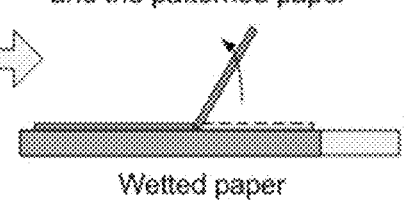

Hybrid Switch Design (for ON, OFF and ON-OFF Switching Capability):

More functional forms of switches may be seamlessly intergrated into the final paper-based microfluidic device by incorporating both the basic paper switches described earlier as well as switches made of plastic (Mylar) strips, as illustrated in FIGS. 2A-2C. For instance, the intrinsic properties of the Mylar transparency strip may be appropriate for the realization of these switches. Akin to paper, Mylar strips, when bent about an axis, undergoes a plastic deformation, slightly expanding it at the bent region. The bent Mylar strip consequently assumes the new bent configuration, as illustrated in FIG. 2A. When the flap is deformed to its original position through the application of an external force, as illustrated in FIG. 2B, the removal of this force, as illustrated in FIG. 2C, quickly restores the flap to its bent position. The strip follows elastic deformation in this case as the applied external force on the flap does not lead to any new permanent elongation or contraction of the Mylar material at the bent region. This behavior can be exploited to realize a wide variety of switching configurations in the paper networks.

Figure 3:
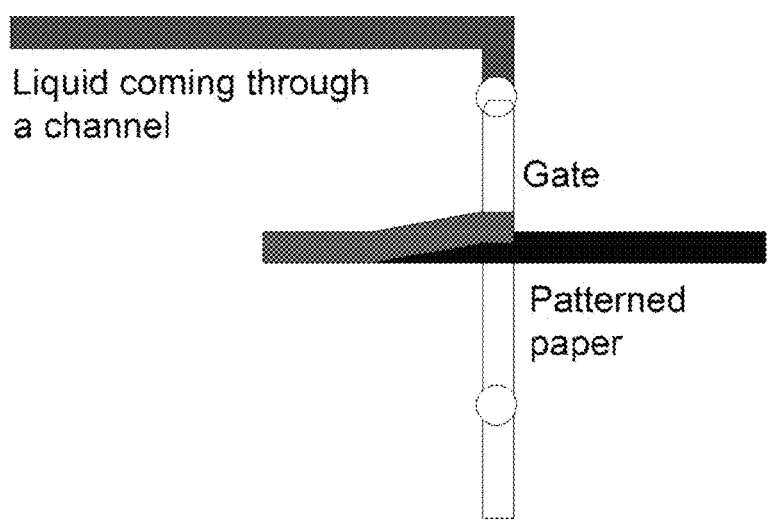

As illustrated in FIG. 3, in order to activate the switch, a small piece of filter paper connecting the channel to the switch is used. This piece of paper resembles the entry point of the liquid to the switch mechanism and hence is called as 'Gate'. The thickness of the gate may be equal to that of the channel and is made of the same filter paper.

Figure 4A:
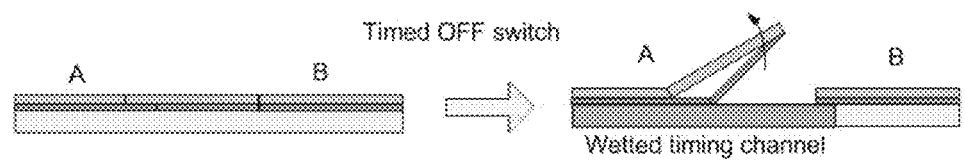
FIGS. 4A-4C illustrate structure and operation of exemplary embodiments of various microfluidic structures that include switching mechanisms using Mylar switches, including a Type 1—Timed Off switch, a Type 2—Timed ON switch, and a Type 3—Timed On-Timed OFF switch.
Figure 4B:
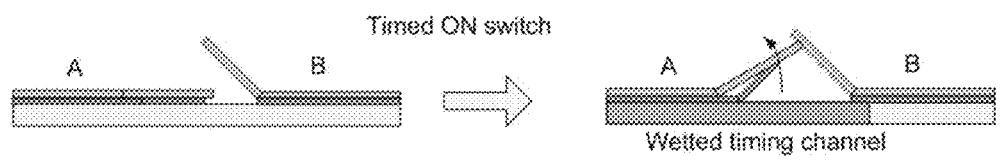
Figure 4C:
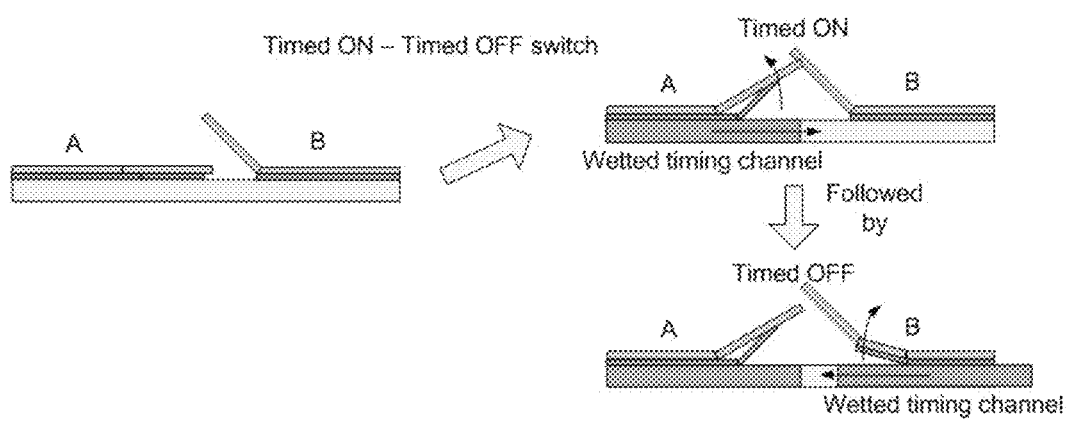

Illustrative embodiments of the structure and operation of a microfluidic structure are show in FIGS. 4A-4C. In such embodiments, as the fluid front flows through a gate, the adhesive strength of a double sided tape connecting the switch to the base or channel paper reduces due to the presence of water. This leads to the springing back of the flap of the switch to its bent position.

Specifically, FIG. 4A illustrates the operation of a Type 1 "timed OFF" switches incorporated within the microfluidic network based on this working principle. In FIG. 4A, the paper switch (paper strip) is initially bridging the channels A and B. Fluidic disconnection between the channels occur when the Mylar switch activates, disconnecting the bridging paper strip (top layer) from contacting the channel B thereby disconnecting the flow between the two channels.

FIG. 4B illustrates the operation of a Type 2 "timed ON" switches. Here, in the initial configuration, channel A and channel B are disconnected from each other due to the lack of a connecting fluidic path. The switching configuration uses one paper switch (on the channel A side which is OPEN initially) and a paper strip on the channel B side overlying on the Mylar switch. As the fluidic front reaches the end of the channel A, the paper switch on channel A activates, actuating the flap towards the horizontal position, (which stops short of fully contacting the channel B); the final resting position being a function of the thickness of the paper, making up the switch. The time 'ON' operation occurs with the activation of the Mylar switch, which would essentially raise the horizontally lying paper strip of channel A to contact the switch of channel B thereby establishing a continuous fluidic path from channel A to channel B.

Figure 17:
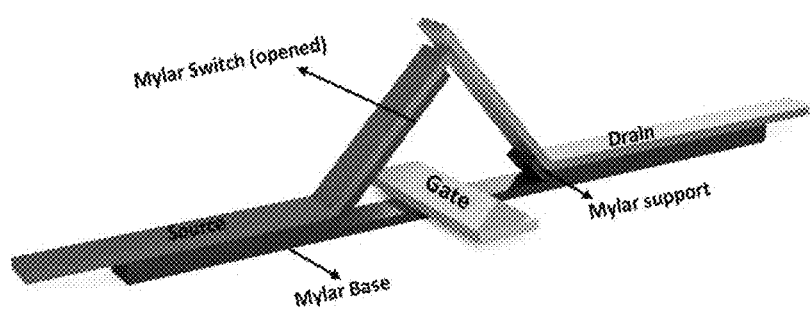
FIG. 17 illustrates an exemplary Timed-On switch as envisioned by the present disclosure.

A schematic of another version of a Timed ON switch is illustrated and described in FIG. 17. Specifically, the switch of FIG. 17 is illustrated to show the fabrication methodology to rapidly prototype the type 2-ON switches with automatic self-aligning capability. The fabrication approach presented may be easily extrapolated to the realization of other types of switches with appropriate modifications. This design approach is akin to the printed circuit board (PCB) electronics wherein various electronic components are inserted and soldered at pre-designated locations on a PCB to realize a functional electronic device. FIG. 17 shows a schematic of the self-aligned switch with its various parts labeled. The switch may be conceived as a modular unit, analogous to an integrated circuit (IC) chip that may be separately realized and then inserted at designated locations into a 2D paper based fluidic network to render it programmable. The type 1 ON switch is a fluidic analog to an electronic transistor and features three fluidic connections. The Source flap, the drain flap and the gate strip that controls the activation of the connections between the source and the drain flaps. For matter of illustration, the source flap here is defined as the one that relies on the actuation of a mylar flap, and the drain flap consists of the bent paper flap that is affixed on a mylar support. The mylar support ensures that when the fluid flows through the drain flap, the maximum angle of actuation of this flap about the crease is controlled thereby preventing unintended shorting of the drain flap with that of the source.

FIG. 4C illustrates the operation of a Type 3 "timed ON-Timed OFF" switches. In this configuration, initially channel A and channel B are disconnected from each other. The ON operation of this structure mimics the ON switch detailed above. With the incorporation of an additional Mylar switch underneath the paper switch on channel B, the switching behavior may be configured to also achieve the timed OFF operation, the OFF timing provided by the second Mylar switch. Thus, one can obtain both a timed ON operation followed by a timed OFF operation to control the fluid flow from one channel to the other. This flexibility is especially important from the view point of automation of the assays wherein often times, an accurate timing control is needed to control the amount of reagent delivered to the detection zone from individual channels of the device; each channel in-turn holding a particular reagent in its dried form.

A hybrid ON-OFF switch design has the capability to turn off the flow of liquid after a certain time. The time can be controlled by changing the length and thickness of the channel. Similar to ON switches, the ON-OFF switch is the realization of two switch flaps stuck opposite to each other. The difference is that one of the switch flaps will function as the support flap in the initial stage which will then work as the OFF switch in a later stage. Thus by changing the length of the channel carrying the liquid for ON stage and OFF stage, we can change the time at which both the stages are activated.

Self Aligned Switches Fabrication:

To facilitate modularity in the design, switches are fabricated separately and installed into the pre-printed paper fluidic network, akin to installing integrated circuit chips onto a printed circuit board. These individual switch modules, because of the way these are fabricated, come pre-aligned to facilitate reliable operation during switching.

Figure 5:
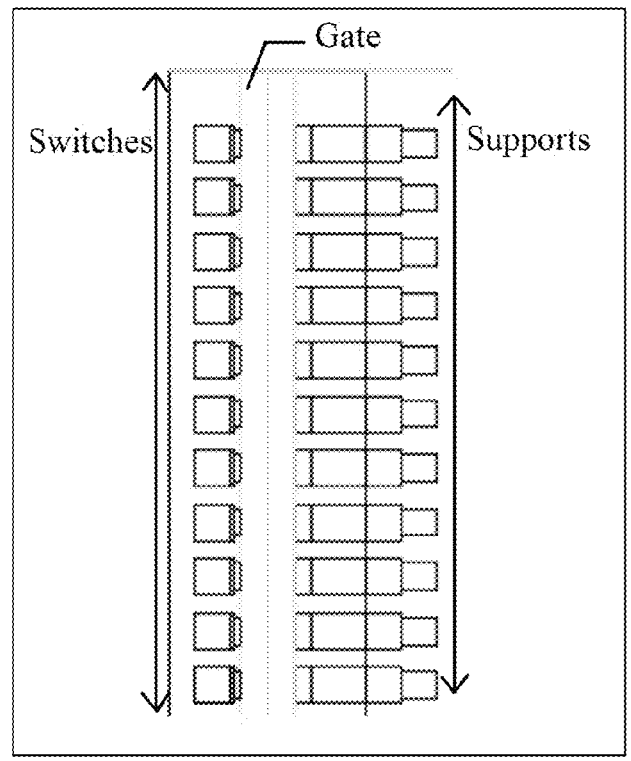
FIG. 5 illustrates an exemplary printed Mylar strip for use with fabrication of self-aligned switch devices.
Figure 6:
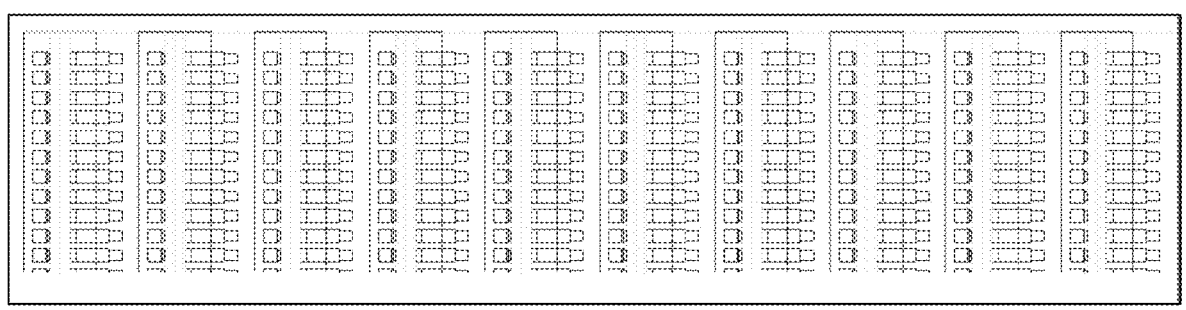
FIG. 6 illustrates an exemplary full-size printed Mylar sheet including multiple Mylar strips with self-aligned switches, as illustrated in FIG. 5.

The switches and the supports are fabricated as usual as per the process described herein. As illustratively shown in FIG. 5, a new sheet of Mylar is taken and the switches and supports are pasted over it. This Mylar sheet may be printed with the exact dimensions showing where to stick the switch and the flap or support. Also, a small gap, which may illustratively be about 4 mm, for the gate is also present on the Mylar sheet, thereby showing the user exactly where the switch will fit on the device. In the illustrative example of FIG. 5, the supports and switches are pasted adjacent the sides of the Mylar sheet. The gap in between the switch and support shown in yellow ink is used for the gate. Thus with a single printed Mylar sheet, many switches can be made easily making mass production easier. FIG. 6 illustrates a full-sized printed Mylar sheet with switches and supports.

Figure 7:
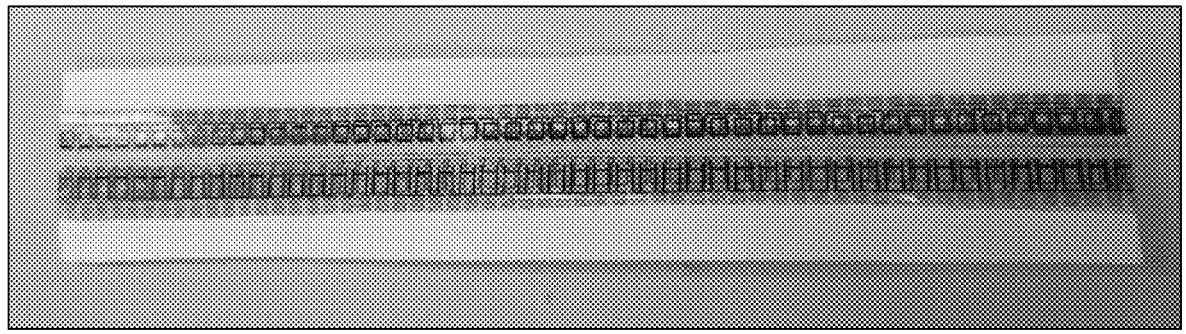
FIG. 7 illustrates an exemplary array of self-aligned switches as illustrated in FIG. 5 capable of being separated or cut to design a microfluidic structure.
Figure 8:
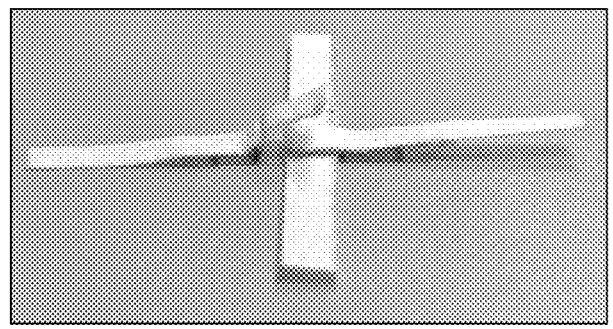
FIG. 8 illustrates an example of a self-aligned switch separated from a Mylar sheet and configured to be used as a Timed ON switch.

The use of this Mylar sheet makes the job tremendously easier and makes the device commercially more viable. FIG. 7 shows an actual realisation of how a printed strip of Mylar sheet for a self-aligned switch may be presented. As illustrated in FIG. 8, this strip is then cut into small switches of proper thickness and gates are installed in the designated area. FIG. 8 accordingly illustrates actual realization of a self-aligned Timed ON switch.

Figure 9:
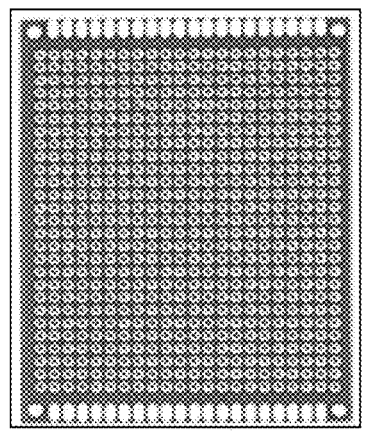
FIG. 9 illustrates an exemplary embodiment of a printed circuit board (PCB)

Fabrication Details of the Device:

It is envisioned that the design of the microfluidic device is illustrative formed and configured to serve the diagnostic goal. An illustrative embodiment of an exemplary design of a microfluidic device 100 is shown in FIG. 22, but other configurations and designs are envisioned and encompassed within the scope of the disclosure herein. The design of FIG. 22 consists of fully optimized thickness for a timing channel and switches that are neatly tucked away to look appealing. Also there is minimal leakage as long as it is not oversaturated with liquid and the switches were handled properly. This device has been optimized so there will be no shorting, leakage, a quick result and fast and easy to manufacture as well. This device doesn't use the heat seals and thus the thickness of the overall micropad is also reduced (since the heat seals were twice as thick as the self-adhesive laminating sheets). Also, this design features fully pre-aligned switches which are easy to manufacture and assemble. This also gives a commercial up step to the design. Exemplary dimensional specifications of the µpad can be as follows:

Total length of the upad is 2.5 inch.
Total width is 1 inch
Radius of each reagent well is 0.1 inch
Thickness of all timing channels is 0.06 inch In illustrative embodiments, the microfluidic device is made completely of filter paper and laminating sheets and is modelled on the way modern PCBs works. A printed circuit board (PCB), as illustratively shown in FIG. 9, mechanically supports and electrically connects electronic components using conductive tracks, pads and other features etched from copper sheets laminated onto a non-conductive substrate. A bare PCB as shown in FIG. 9 is a board onto which holes are drilled in a patterned manner and commercialised. The end user then attaches components such as resistor, capacitor, diodes, and the like, depending on the circuit design and the requirements in some of these holes. This design gives multi-functionality & flexibility to the circuit design. The design approach disclosed and described herein reflects this approach. At this stage, holes are punched onto the device on which the end user can install 2 switches which are analogous to the passive devices like R,L,C.

Figure 10:
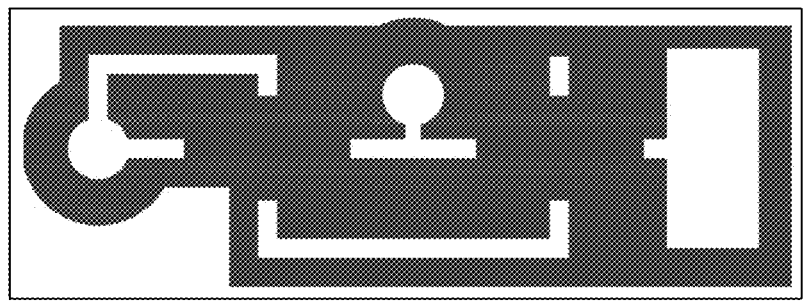
FIG. 10 illustrates an exemplary design of a microfluidic device structure created utilizing an automated, computer-aided drafting program.

In illustrative embodiments, the first step to fabricate the device is to draft its design in AutoCAD or similar programs. AutoCAD is a drafting tool which is used to design various industrial machine & equipment models with precise accuracy and repeatability. The device may be designed in AutoCAD with the scale set at 1:1. This makes the fabrication easier since the exact dimensions of the real device are replicated on the software. Along with that, because the device is smaller, multiple copies may be made of the same device in a single sheet of paper. This also makes the device commercially more viable since mass production becomes easier. An illustrative example of an AutoCAD design of the device is shown in FIG. 10, although other forms of computer-aided drafting are envisioned herein.

After the design is prepared, portions of the microfluidic device structure may illustratively be printed using a wax printed on a filter paper (e.g. Whatman grade). To form the fluidic channels, the printed devices are subjected to a heating step that melts the wax in the regions corresponding to the printed regions. Regions not containing the wax remain hydrophilic thereby providing fluidic paths to the aqueous solutions. At this stage, the device illustratively looks as shown in FIG. 11.

Figure 11:
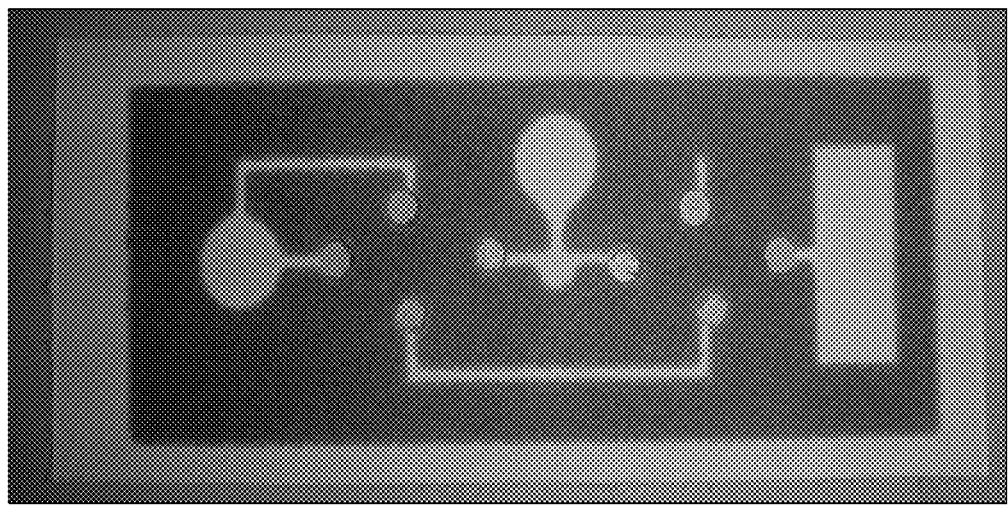
FIG. 11 illustrates a top perspective view of the microfluidic device of the exemplary design of FIG. 10, illustrating channels formed in the device and holes prepared in the device for receipt of one or more switches.

After the fluidic paths have been formed on the paper, holes are then punched into the paper where the prefabricated switches are to be installed, as illustrated in FIG. 11. The holes are made at the spots where the switches touch the device and from where they are actuated (the incoming channel).

Figure 12:
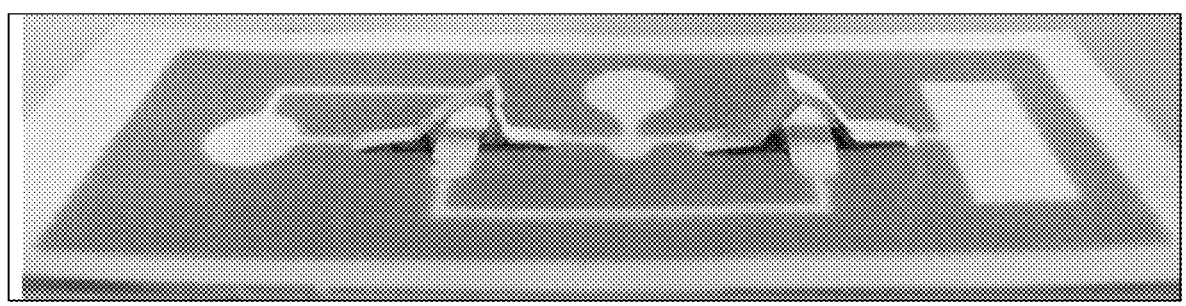
FIG. 12 illustrates a side perspective view of the microfluidic device of FIG. 11 after an arrangement of switches is coupled to the device.

As illustrated in FIG. 12, the switches are thereafter attached to the rest of the microfluidic device. For example, in FIG. 12, the incoming channel is connected to the actuation spot of the device using the gate as mentioned earlier. Ins FIGS. 11-12, a total of 8 holes are made in the entire device, 2 for each of the two switches and 2 for each of the two gates, and the switches are attached thereto. At this stage, the device looks as shown in FIG. 12. After the device is ready, it can be used for testing and for conducting biological assays.

Use of paper in biological diagnostics is enhanced by the methods and devices disclosed herein. Being paper, the devices are extremely inexpensive and can be made from off the shelf materials. The use of mechanical switches and Mylar sheet makes the design modular and rugged. These switches can be mass produced by using the printed Mylar sheet described above. Thus, by the use of these devices, diagnosis in countries and regions which are sensitive to cost can be easily accomplished Eliminating the use of any large and complex machinery makes it viable for transportation and underdeveloped countries. Thus, a social cause is served and the proposed design can be helpful in saving lives.

Switch Activation Angle

Figure 32:
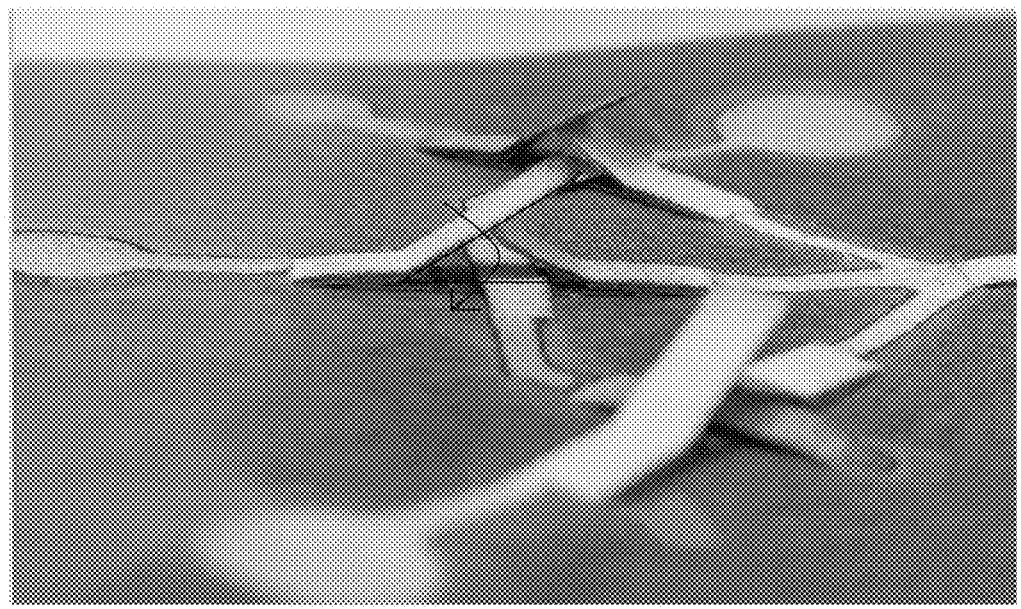
FIGS. 32-33 illustrate portions of a device with switches and further illustrate screenshots of an angle calculation for the switches.
Figure 33:
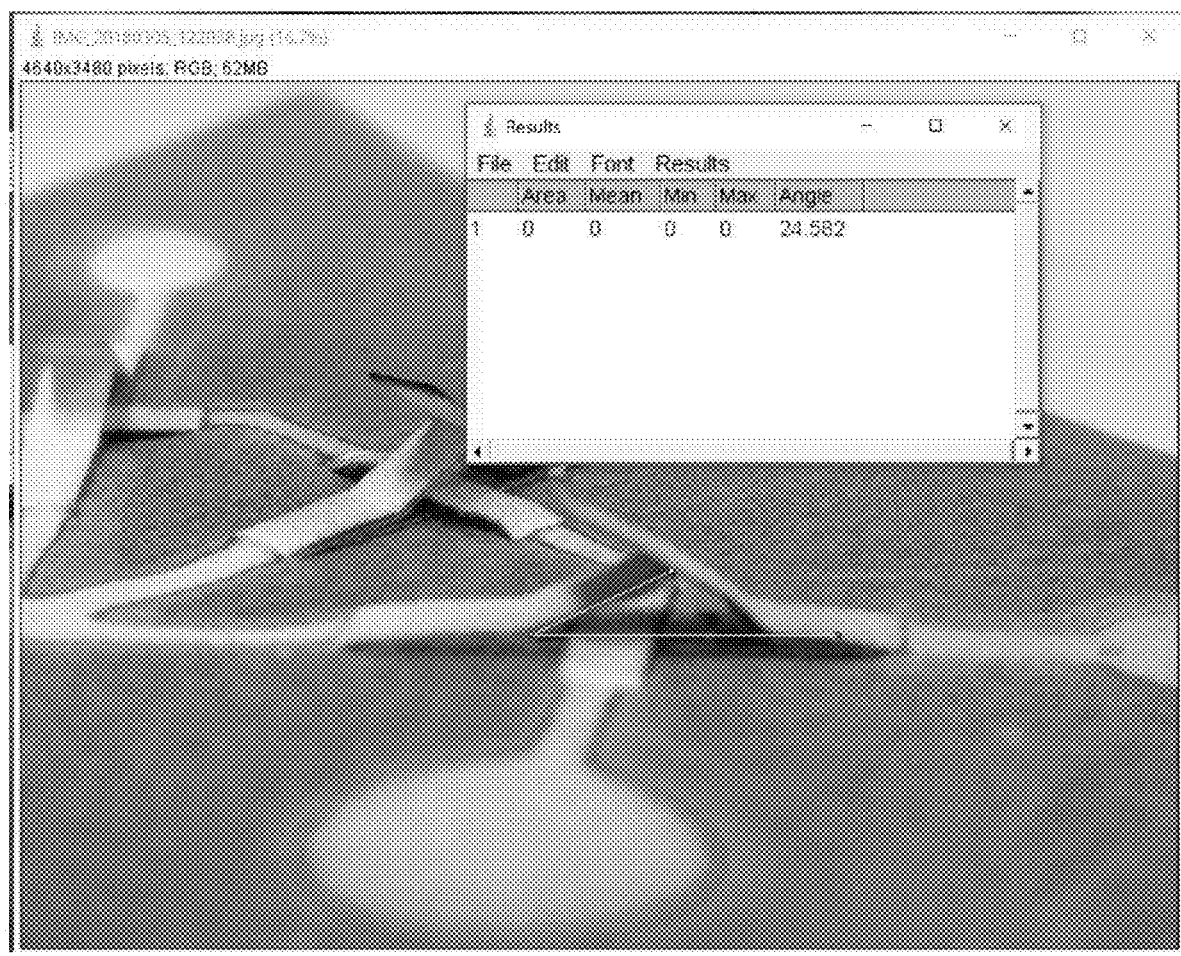

The present disclosure also considered activation angle of a switch. Such information is rather useful for packaging purposes and to make sure that the supports are at a reachable angle for the switches. In illustrative embodiments, ImageJ® software can be used to measure angle of activation for various switches. FIGS. 32-33 illustrate portions of a device with switches and screenshots of the actual software used for measuring the activation angle, and the data is tabulated in Table 1 below.

As illustrated in Chart 1 below, average activation angle was found to be about 25.50 degrees. Also, from this it can be calculated that the optimum angle that is required by the supports to maintain:

$$25.5 + 90 + (x) = 180 \text{ degrees}$$

$$X === 64.5 \text{ degrees}$$

Thus if measured in anticlockwise direction, the optimum angle that a support flap should maintain is (180−64.5)= 115.5 degrees.

TABLE 1

Data Showing the Activation Angle for the Switches

| Switch No. | Activation Angle (in degrees) |
|---|---|
| 1 | 23.66 |
| 2 | 28.33 |
| 3 | 24.73 |
| 4 | 25.1 |
| 5 | 28.81 |
| 7 | 25.38 |
| 8 | 25.46 |
| 9 | 26.57 |
| 10 | 22.11 |
| 12 | 22.7 |
| 13 | 26.57 |
| 14 | 26.57 |
| Average Activation angle | 25.499 |

EXAMPLES

The following examples are provided for illustrative purposes and are not intended to limit the scope of the disclosure.

Example 1: Two Reagent Device with Food Dyes to Simulate Flow

FIGS. 13A1-13H2 illustrate function of an illustrative microfluidic structure 100 including two switches 102 and 104 with the use of food dyes. As illustrated, the flow of food dyes simulates how the device works. For reference, FIG. 13A1 is a top perspective view and FIG. 13A2 is a side perspective view of the microfluidic structure 100 at the same point in time during the process, i.e. right after the food dyes were introduced. Similarly, FIG. 13B1 is a top perspective view and FIG. 13B2 is a side perspective view of the microfluidic structure at the same point in time after that shown FIGS. 13A1 and 13A2, and so on and so on. As illustrated, the switches 102 may be a timed ON switch, or alternatively a timed on, time off switch, depending on the desired characteristics.

As shown in FIGS. 13A1 and 13A2, blue colored dye 110 and red colored dye 112 are pipetted in two wells 106 and 108, respectively. The dyes start flowing through one or more channels 120 as depicted in FIGS. 13B1 and 13B2. After a specific time, the blue dye flows through a gate 122 and activates the first switch 102, causing a first portion 102F of the first switch 102 to be released from engagement with the gate 122 below it and engage with a second portion 102S above the first portion 102F. As the second portion 102S is engaged with the channel 120 to the first of the first switch, there is a connection between the first portion 102F of the first switch 102 and the channel 120 to the right of the first switch 102, as visible in the FIG. 13C2 (e.g. the first switch is activated). The liquid also then starts flowing through a timing channel 124, as seen in FIG. 13D1, and travels all the way through the channel 124 to activate the second switch 104 (right side) in a similar manner as switch 102 was activated, as seen in FIGS. 13E1 through 13F2, thereby permitting engagement between a first portion 104F and second portion 104S of the second switch. As seen in FIG. 13F1, the liquid activates the second switch 104 and thus a connection with a drain or detection zone 126 (right side well) is established, creating a fluid flow path between the channel 120 extending from the first switch 102 and the drain 126. Since the pressure in the drain 126 at this point of time is minimum, all the fluid start flowing to the drain. This is visible from FIG. 13G1. The process continues until all the liquid (110 and 112) in both the wells move into the drain region 126, as illustrated in FIG. 13H1. Thus, the microfluidic device 100 is capable of sequentially loading two fluids/reagents with the use of completely mechanical switches.

Example 2: An ALP Test Use of More than Two Reagents

Figure 14:
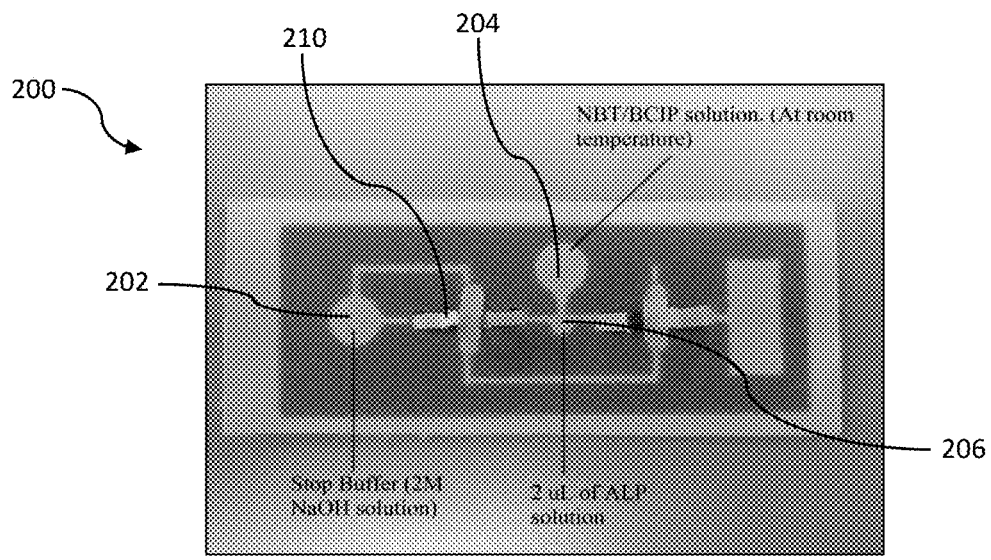
FIG. 14 shows a top perspective view of an alternative embodiment of a microfluidic device, illustrating a design configured to test a simple biologic assay to detect alkaline phosphatase.

Another example includes where a simple biological assay was conducted to detect alkaline phosphatase (ALP). A 2 µL solution of ALP was pipetted on a microfluidic device 200 at a first well 206 (middle middle), as shown in FIG. 14. The ALP was allowed to dry at room temperature for about one hour. A 40 µL enzyme substrate solution of NBT/BCIP (20 mg 1-1) was pipetted in a second well 204 (top middle). NBT/BCIP substrate was used because it gives a black precipitate on reacting with ALP. A 40 µL solution of 2 molar NaOH was used as a stop buffer at a buffer well 202 (middle left) which would stop the further precipitation of the ALP. As noted, the solution of NaOH was deposited in the first well 206. The solvent used for all the solutions for the experiment was DI water.

Figure 15:
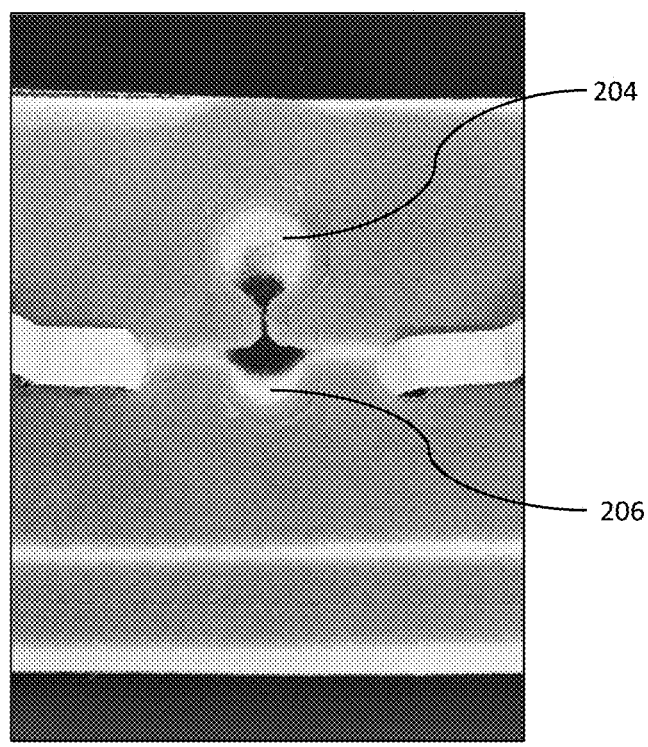
FIG. 15 is a detailed view of a portion of the microfluidic device of FIG. 14 after a reaction occurs involving a black precipitation at a location of chemical reaction.

As soon as the enzyme came in contact with the ALP, the black precipitate started to appear near the spot as shown in FIG. 15, indicating that the reaction had started. The stop buffer in the left well 202 activated a first switch 210 and thus made a short with the ongoing reaction between the ALP and the enzyme. The stop buffer stopped the reaction and thus prevented further precipitation and thereby blackening at the spot.

Example 3: Multi-Reagent Device Design

Examples 1 and 2 show the device is capable of performing biological assays for up to 2 reagents. However, there are certain assays or tests which require more than 2 reagents for satisfactory operation. Hence, a device is contemplated that is capable of performing biological assays up to 4 or more reagents.

A microfluidic device of the present disclosure can also be used as a multiple reagent holding device. The need for multi-reagent device may arise from the necessity to perform complex assays that require more steps to be performed. Such assays generally feature a wash step in which a buffer washes away excess of the reagent so that the incoming enzyme can react properly with the substrate. Although a two reagent device can perform various biological assays, the number of reagents it can sequence hinders its use for complex assays.

Figure 23:
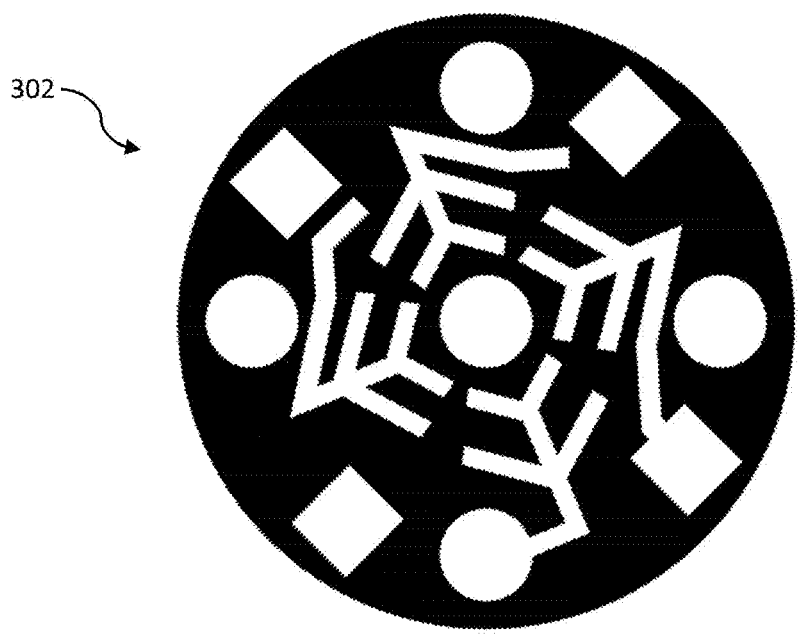
FIGS. 23-26 illustrate an exemplary embodiment of a design, assembly, and/or operation of a a multiple reagent device accordingly to the disclosure.
Figure 24:
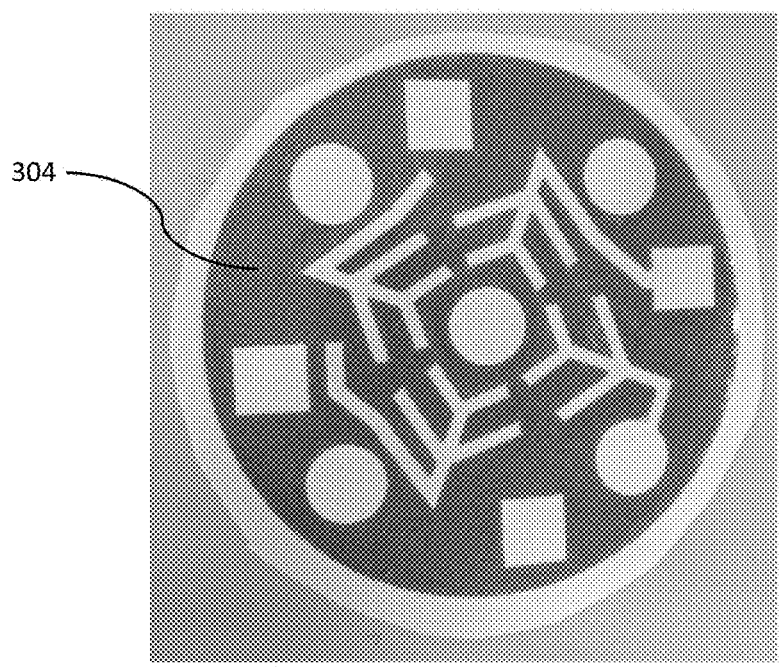
Figure 25:
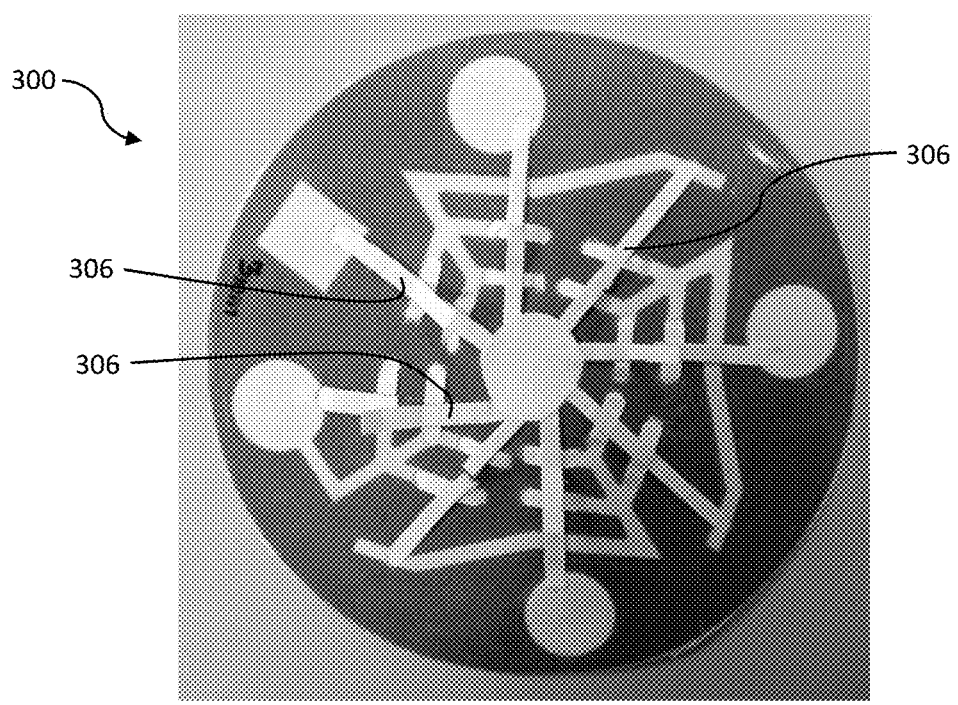
Figure 26:
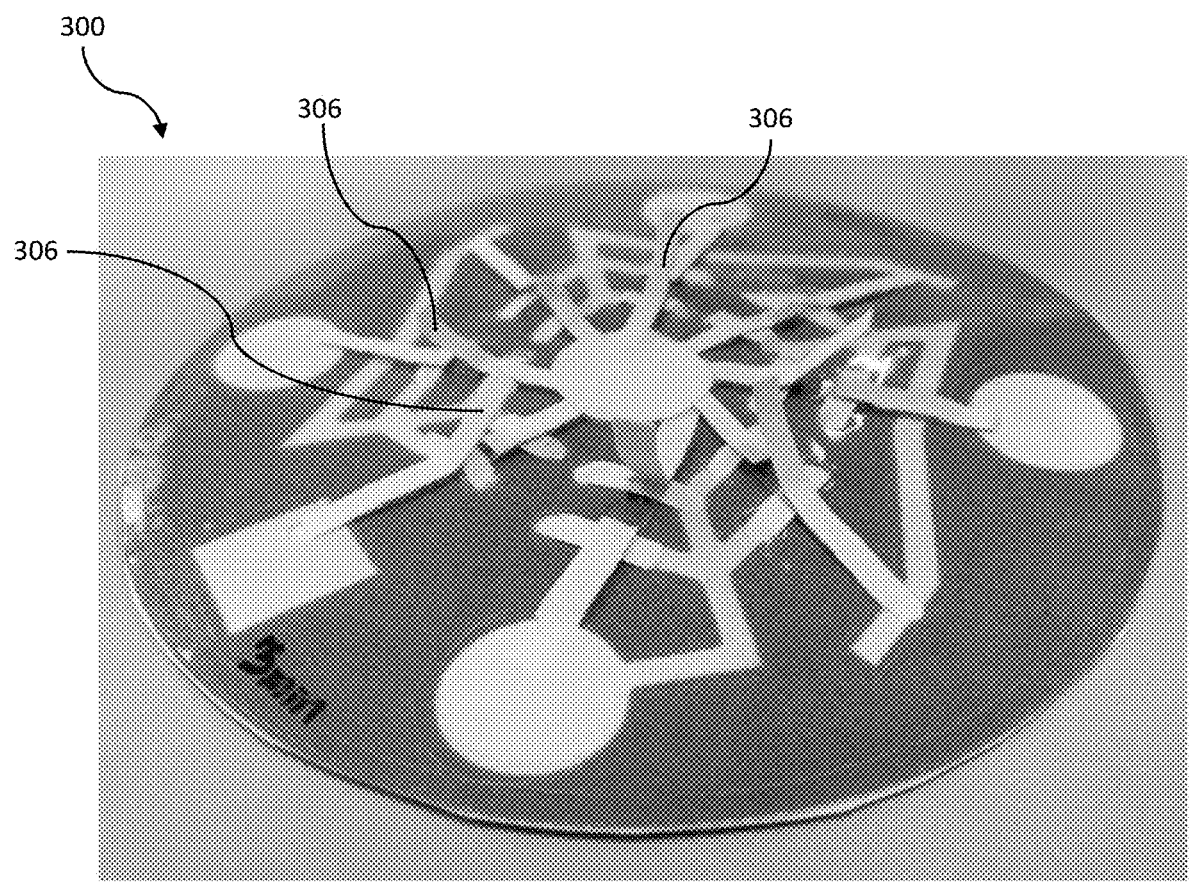
Figure 27:
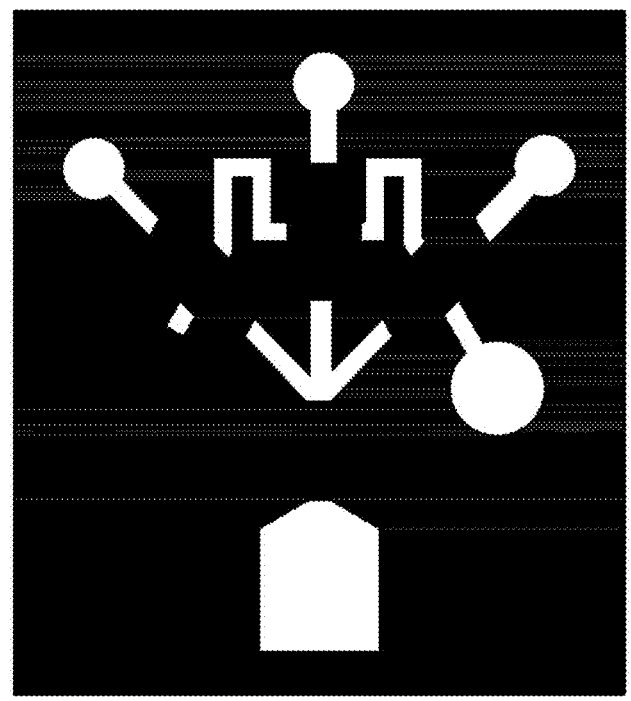
FIGS. 27-31 illustrate another exemplary embodiment of a multi-reagent microfluidic device according to the disclosure.

An illustrative design of a multiple reagent device is shown in FIGS. 23-26. As illustrated, after a base 304 of a multi-reagent device 300 is printed (e.g. via an AutoCAD design 302 as illustrated in FIG. 23) using a wax paper, it can be heated uniformly so that the wax seeps through and forms a hydrophobic layer even on the other side. FIG. 24 shows how the device looks after the heating stage is done. After this stage the device 300 is now ready for final assembly of switches 306 and then the testing. A complete device with the switches assembled is shown in FIGS. 25-26.

Figure 28:
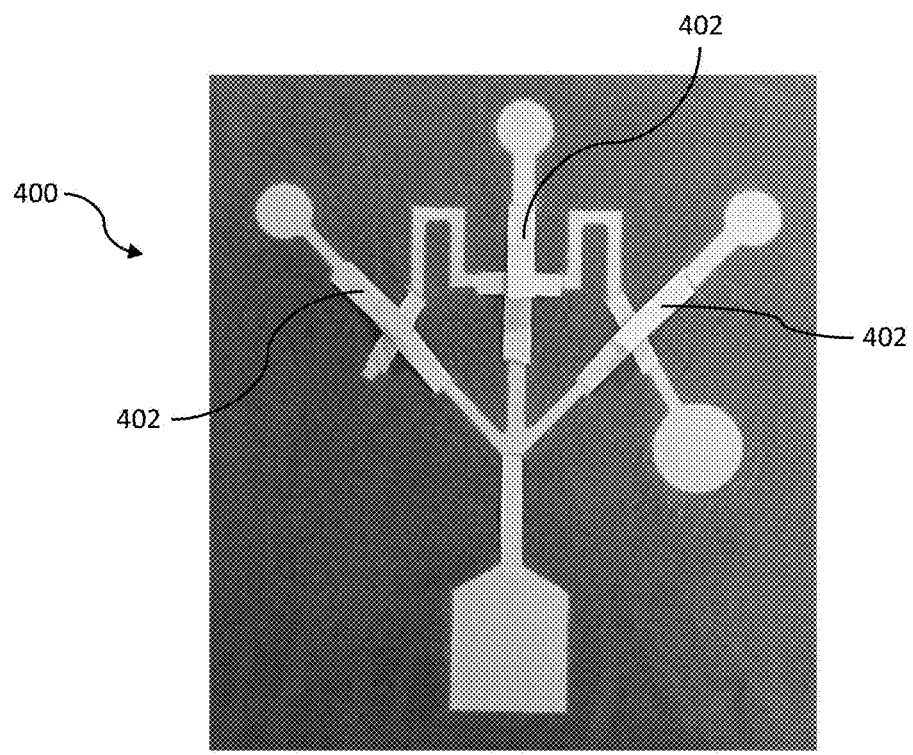
Figure 29:
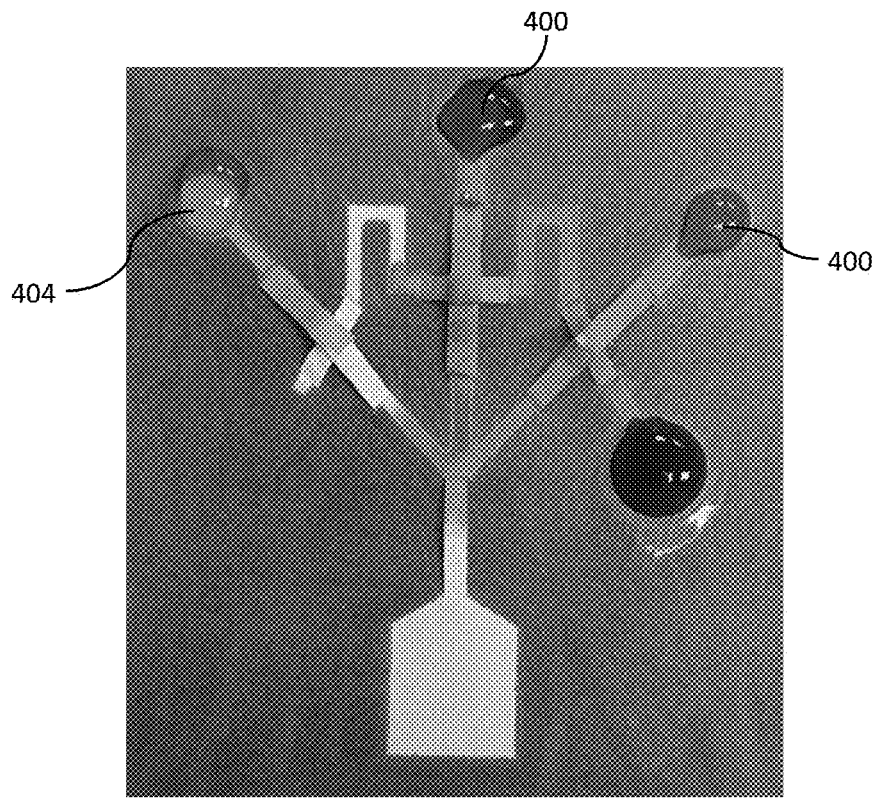
Figure 30:
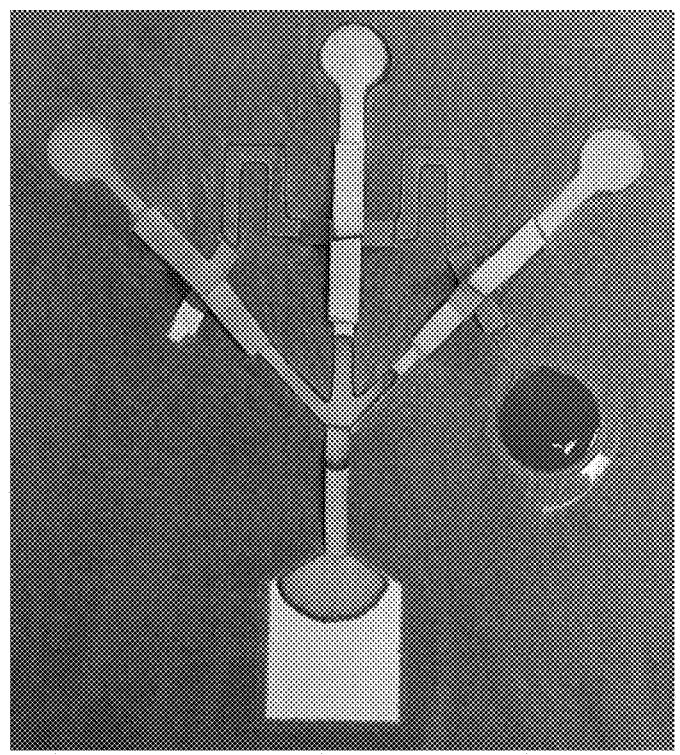
Figure 31:
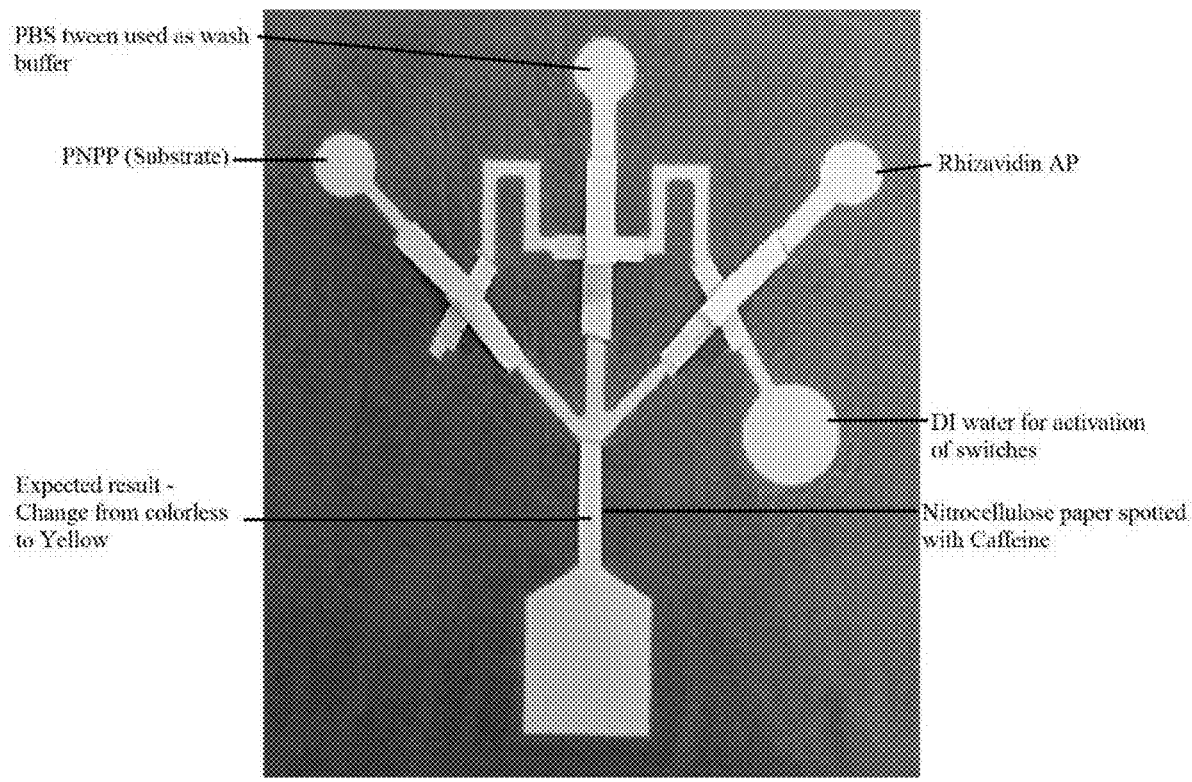

Another alternative design of a multi-reagent microfluidic device 400 is illustrated in FIGS. 27-31. Device 400 is a simple device capable of sequencing three reagents without any complexity. This design features the use of three reagents 404, 406, and 408 and is thus easier to fabricate. Also, it uses only three switches 402 and thus the possibility of leakage was low. FIG. 2.7 shows a simplified AutoCAD design for a prototype of device 400, while FIG. 28 shows a fully assembled device 400, and FIGS. 29-30 illustrate the beginning and end of testing of the device 400. FIG. 31 illustrates an exemplary test of the device 400 for testing the presence of caffeine in a sample.

Figure 16:
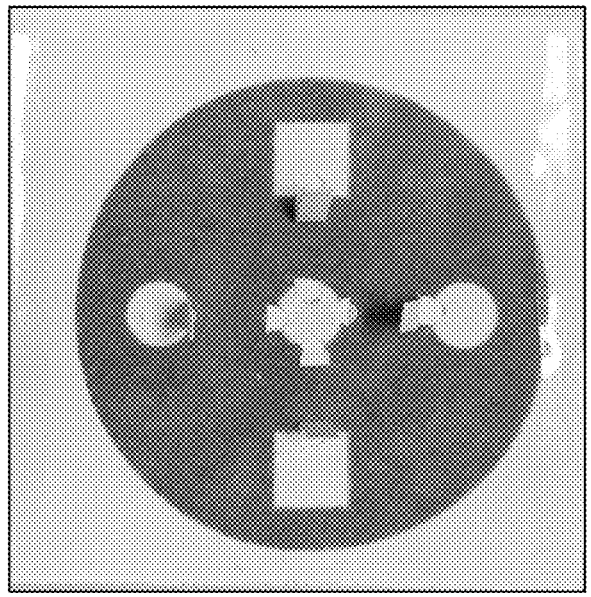
FIG. 16 illustrates a top perspective view of an alternative embodiment of a microfluidic device, illustrating a design that can accommodate use of a multi-reagent assay.

Another alternative design of the microfluidic device is shown in FIG. 16. Other forms or designs are envisioned herein as well. With the design of FIG. 16, more complex assays can be performed thereby expanding the scope of the invention.

MATERIALS AND METHODS

Programmability is important to the otherwise passive paper microfluidic networks, whereby fluid flow may be timed and accurately controlled through various channels in the network. This is accomplished through simple switches made of paper and Mylar transparencies that completely derive their power from gravity, capillarity and/or inherent elastic energy.

Devices disclosed further gain from being highly modular in design, thereby enabling rapid prototyping, akin to the Printed Circuit Board (PCB) designs. The design of these devices features fluidic channels on paper containing positioned holes where the switches are to be installed. Installation of these switches bestows the necessary functionality to the devices.

PUBLICATIONS CITED

These publications are incorporated by reference to the extent they relate materials and methods disclosed herein.
1. A new paper-based platform technology for point-of-care diagnostics by Roman Gerbers, Wilke Foellscher, Hong Chen, Constantine Anagnostopoulosb and Mohammad Faghri
2. A versatile valving toolkit for automating fluidic operations in paper microfluidic devices by Bhushan J. Toley, Jessica A. Wang, Mayuri Gupta, Joshua R. Buser, Lisa K. Lafleur, Barry R. Lutz, Elain Fu and Paul Yager
3. Carrilho, E., Martinez, A. W. & Whitesides, G. M. Understanding Wax Printing: A Simple Micropatterning Process for Paper-Based Microfluidics. Analytical Chemistry 81, 7091-7095, doi:10.1021/ac901071p (2009).
4. Li, X., Tian, J., Nguyen, T. & Shen, W. Paper-Based Microfluidic Devices by Plasma Treatment. Analytical Chemistry 80, 9131-9134, doi:10.1021/ac801729t (2008).
5. United States Patent Application Publication; Pub. No.: US 2012/0198684 A1, Carrilho et al. Pub. Date: Aug. 9, 2012
6. Programmable diagnostic devices made from paper and tape; Andres W. Martinez, Scott T. Phillips, Zhihong Nie, a Chao-Min Cheng, Emanuel Carrilho, Benjamin J Wileya and George M. Whitesides; Lab Chip, 2010, 10, 2499-2504, Royal Society of chemistry.
7. https://en.wikipedia.org/wiki/Printed_circuit_board
8. A fluidic diode, valves, and a sequential-loading circuit fabricated on layered paper by Hong Chen, Jeremy Cogswell, Constantine Anagnostopoulos and Mohammad Faghri; Lab on a chip, 2012, 2909-2913

The invention claimed is:

1. A paper-based microfluidic diagnostic device comprising:
   a base comprising:
      a first well configured to receive a first aqueous solution;
      a second well configured to receive a second aqueous solution, wherein the second well is spaced away from the first well;
      a channel having a first portion coupled to the first well and a second portion spaced apart from the first well, the channel providing passive transportation of the first aqueous solution from the first well;
      a first switch coupled to the base having a first portion and a second portion, the first portion of the first switch in fluid communication with the second portion of the channel, the first switch comprising a flap including the second portion of the first switch, the flap being pivotable with respect to the base from a first position where the second portion of the first switch is spaced from the base a first distance to a second position where the second portion of the first switch is spaced from the base a second distance, and wherein the first switch includes a second channel for passive transportation of the first aqueous solution from the first portion of the first switch to the second portion of the first switch;
      a gate that fluidly connects the channel of the base with the first switch, permitting the first aqueous solution from the channel to flow into the second channel of the first switch;
   wherein incorporation of the first aqueous solution into the second channel of the first switch causes the flap to move from the first position to the second position;
   wherein the base of the diagnostic device comprises a third channel having a first portion coupled to the second well and a second portion spaced apart from the second well to provide passive transportation of the second aqueous solution from the second well;
   wherein the device further includes a second switch coupled to a portion of the base having a first portion and a second portion, the first portion of the second switch in fluid communication with the second portion of the third channel, the second switch including a fourth channel for passive transportation of the second aqueous solution from the first portion of the second switch to the second portion of the second switch, and the second switch comprising a flap including the second portion of the second switch, the flap being pivotable with respect to the base;
   wherein the second portion of the second switch is pivotable from a first position that is spaced from the second portion of the first switch a first distance to a second position that is spaced from the second portion of the first switch a second distance when the second aqueous solution is incorporated into the fourth channel; and
   wherein the second portion of the first switch is configured to be in fluid communication with the second portion of the second switch before the second aqueous solution is transported in the fourth channel of the second switch, but the second portion of the first switch is configured to be out of fluid communication with the second portion of the second switch after the second aqueous solution is transported in the fourth channel of the second switch.

2. The microfluidic diagnostic device of claim 1, wherein the second distance of the second portion of the first switch is zero and the first distance of the second portion of the first switch is greater than zero.

3. The microfluidic diagnostic device of claim 1, wherein the first distance of the second portion of the first switch is zero and the second distance of the second portion of the first switch is greater than zero.

4. The microfluidic diagnostic device of claim 1, wherein the first aqueous solution is a first reagent and the second aqueous solution is a second reagent.

5. The microfluidic diagnostic device of claim 1, wherein the second portion of the first switch is configured to fluidly communicate with the third channel of the base.

6. The microfluidic diagnostic device of claim 1, wherein the first switch is configured to be pivoted from the first position to the second position before the second switch is configured to be pivoted from the first position to the second position.

7. The microfluidic diagnostic device of claim 1, wherein a section of the first switch is configured to at least partially underlie a section of the second switch.

8. The microfluidic diagnostic device of claim 7, wherein the second portion of the first switch is coupled to the base via an adhesive when the flap of the first switch is in the first position, but the second portion of the first switch is uncoupled from the base when the flap of the first switch is in the second position.

9. The microfluidic diagnostic device of claim 1, wherein the first aqueous solution is transported through the second channel of the first switch a predetermined amount of time before the second aqueous solution is transported through the fourth channel of the second switch.

10. The microfluidic diagnostic device of claim 1, wherein the device further includes a detection zone, and delivery of a portion of the first or second aqueous solutions to the detection zone can be sequenced in a predetermined manner through use of the first and second switches.

11. The microfluidic diagnostic device of claim 1, wherein the second portion of the first switch is configured to fluidly communicate with the fourth channel of the second switch when the first switch is moved from the first position to the second position.

12. The microfluidic diagnostic device of claim 1, wherein the base comprises a wax product.

13. The microfluidic diagnostic device of claim 1, wherein the first switch comprises Mylar.

14. The microfluidic diagnostic device of claim 1, wherein the gate comprises filter paper.

15. A paper-based microfluidic diagnostic device comprising:
    a base comprising:
      a source coupled to the base having a first portion, a second portion, and a channel, the source comprising a flap including the first portion of the source, the flap being pivotable with respect to the base from a first position where the first portion of the source is in contact with a gate to a second position where the first portion of the source is spaced from the base a second distance, apart from the gate;

wherein incorporation of an aqueous solution into the gate causes the flap to move from the first position to the second position.

16. The device of claim 15, wherein the flap is in fluid communication with a drain when in the second position.

17. The device of claim 15, wherein the flap comprises an adhesive, which adheres the flap to the gate when the flap is in the first position.

\* \* \* \* \*